US012736948B2

(12) United States Patent
Manikani et al.

(10) Patent No.: US 12,736,948 B2
(45) Date of Patent: Sep. 15, 2026

(54) DEVICES, SYSTEMS, AND METHODS FOR FIELD EQUIPMENT DATA MONITORING

(71) Applicant: Schlumberger Technology Corporation, Sugar Land, TX (US)

(72) Inventors: Sunil Manikani, Pune (IN); Guru Prasad Nagaraj, Pune (IN); Rishabh Thapliyal, Pune (IN); Aditya Kotiyal, Lysaker (NO); Federico Sporleder, Pune (IN)

(73) Assignee: Schlumberger Technology Corporation, Sugar Land, TX (US)

( * ) Notice: Subject to any disclaimer, the term of this patent is extended or adjusted under 35 U.S.C. 154(b) by 294 days.

(21) Appl. No.: 18/696,267

(22) PCT Filed: Oct. 25, 2022

(86) PCT No.: PCT/US2022/047649

§ 371 (c)(1),
(2) Date: Mar. 27, 2024

(87) PCT Pub. No.: WO2023/076211

PCT Pub. Date: May 4, 2023

(65) Prior Publication Data

US 2024/0393769 A1 Nov. 28, 2024

(30) Foreign Application Priority Data

Oct. 25, 2021 (IN) ............................. 202121048518

(51) Int. Cl.
*G05B 19/4155* (2006.01)

(52) U.S. Cl.
CPC .................... *G05B 19/4155* (2013.01); *G05B 2219/40283* (2013.01)

(58) Field of Classification Search
CPC .... E21B 19/165; E21B 21/08; E21B 2200/20; E21B 2200/22; E21B 43/00; E21B 49/00; E21B 49/08; E21B 47/00; E21B 47/12
See application file for complete search history.

(56) References Cited

U.S. PATENT DOCUMENTS

2005/0103188 A1* 5/2005 Takemura ............ G11B 27/034
2007/0180421 A1 8/2007 Boose
(Continued)

FOREIGN PATENT DOCUMENTS

WO 2020162885 A1 8/2020

OTHER PUBLICATIONS

Search Report and Written Opinion of International Patent Application No. PCT/US2022/047649, dated Feb. 21, 2023, 10 Pages.
(Continued)

*Primary Examiner* — Nicholas Klicos
(74) *Attorney, Agent, or Firm* — Kyle R. Miiller

(57) ABSTRACT

A method can include receiving field equipment data from a source; detecting a data schema for the source; configuring a listener for the source according to a corresponding detected data schema to receive additional field equipment data; and assessing at least a portion of the additional field equipment data using an assessment engine to generate a hierarchy of data metric values for the source, where the hierarchy is customizable and navigable responsive to receipt of instructions.

20 Claims, 21 Drawing Sheets

(56) References Cited

U.S. PATENT DOCUMENTS

| | | | | |
|---|---|---|---|---|
| 2014/0067353 | A1* | 3/2014 | Shelley | G06N 3/042<br>703/10 |
| 2016/0034517 | A1 | 2/2016 | Babai | |
| 2016/0110369 | A1 | 4/2016 | Cervelli | |
| 2016/0281497 | A1* | 9/2016 | Tilke | E21B 49/00 |
| 2017/0286572 | A1* | 10/2017 | Hershey | B64F 5/60 |
| 2018/0293438 | A1 | 10/2018 | Ortiz | |
| 2019/0195050 | A1 | 6/2019 | Revheim | |
| 2019/0309618 | A1* | 10/2019 | Inyang | E21B 47/07 |
| 2020/0165910 | A1 | 5/2020 | Andresen | |
| 2020/0277848 | A1* | 9/2020 | Johnston | E21B 44/00 |
| 2020/0300064 | A1* | 9/2020 | Gee | E21B 7/04 |
| 2020/0410393 | A1 | 12/2020 | Kuang | |
| 2021/0357636 | A1* | 11/2021 | Bao | E21B 41/00 |
| 2022/0197522 | A1* | 6/2022 | DeLuca | G16Y 10/75 |

OTHER PUBLICATIONS

GitHub—"GridProtectionAlliance_pdqtracker 0 Phasor Data Quality Tracker", downloaded from the internet on Oct. 1, 2025 from ]https://github.com/GridProtectionAlliance/pdqtracker], 2021, 4 pages.

Schlumberger, "InnerLogix 2019.1 Now Available", New Software Release, downloaded on Jan. 19, 2024 from the internet [https://www.software.slb.com/software-news/software-top-news/innerlogix/innerlogix-2019-1], 2019, 4 pages.

"MobyDQ—Official documentation", downloaded on Oct. 1, 2025 from the internet [https://ubisoft.github.io/mobydq/pages/demo/], 2 pages.

* cited by examiner

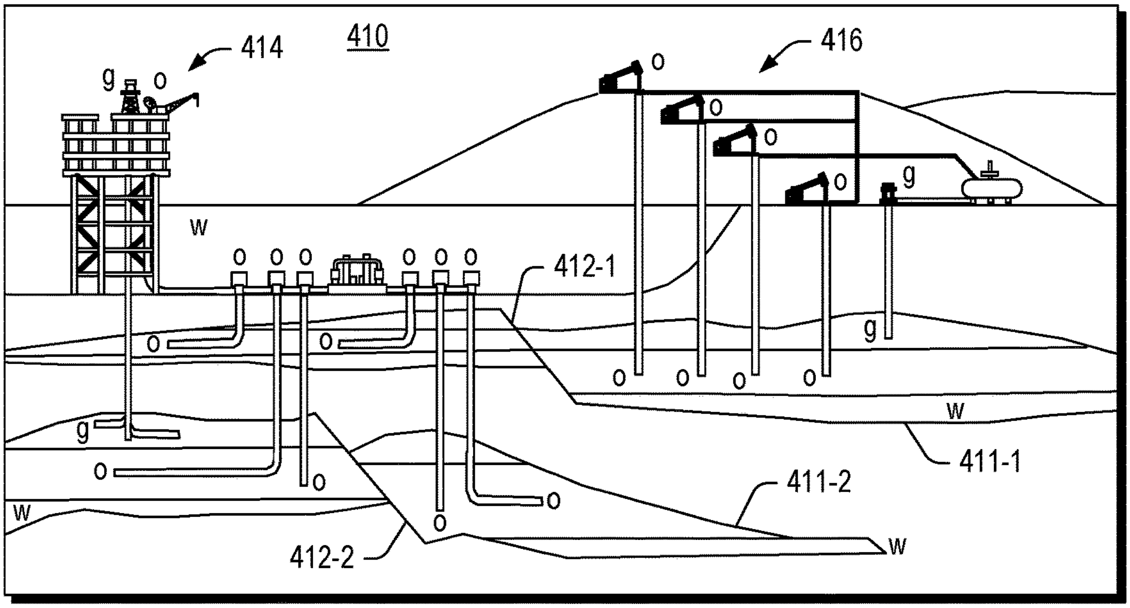
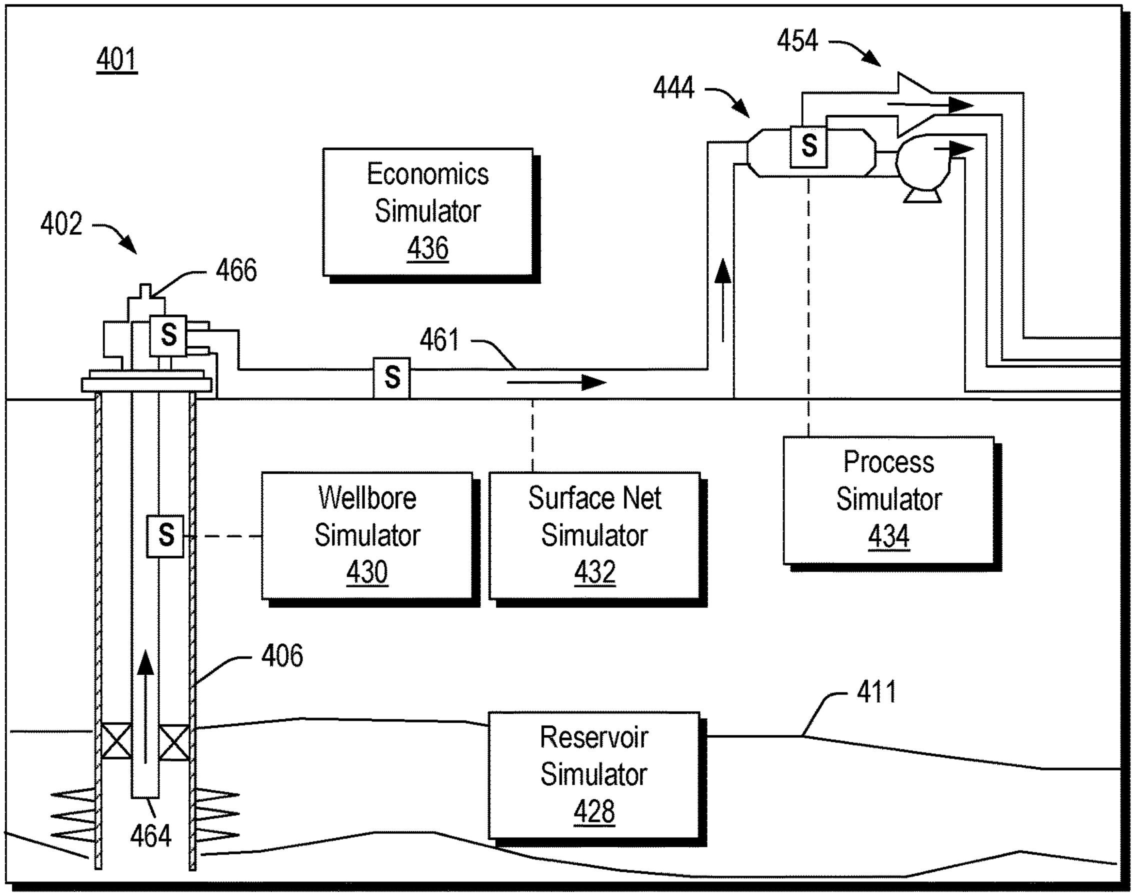
Fig. 4

Method 700

GUI 800

Customizable Root

Well A
4 σ

Completeness
4 σ

Well B
6 σ

Overall
1 σ

Click Insight

Well C
1 σ

Well A
2 σ

Click Insight

Validity
1 σ

Well B
1 σ

Click Insight

Well C
1 σ

Customizable Root

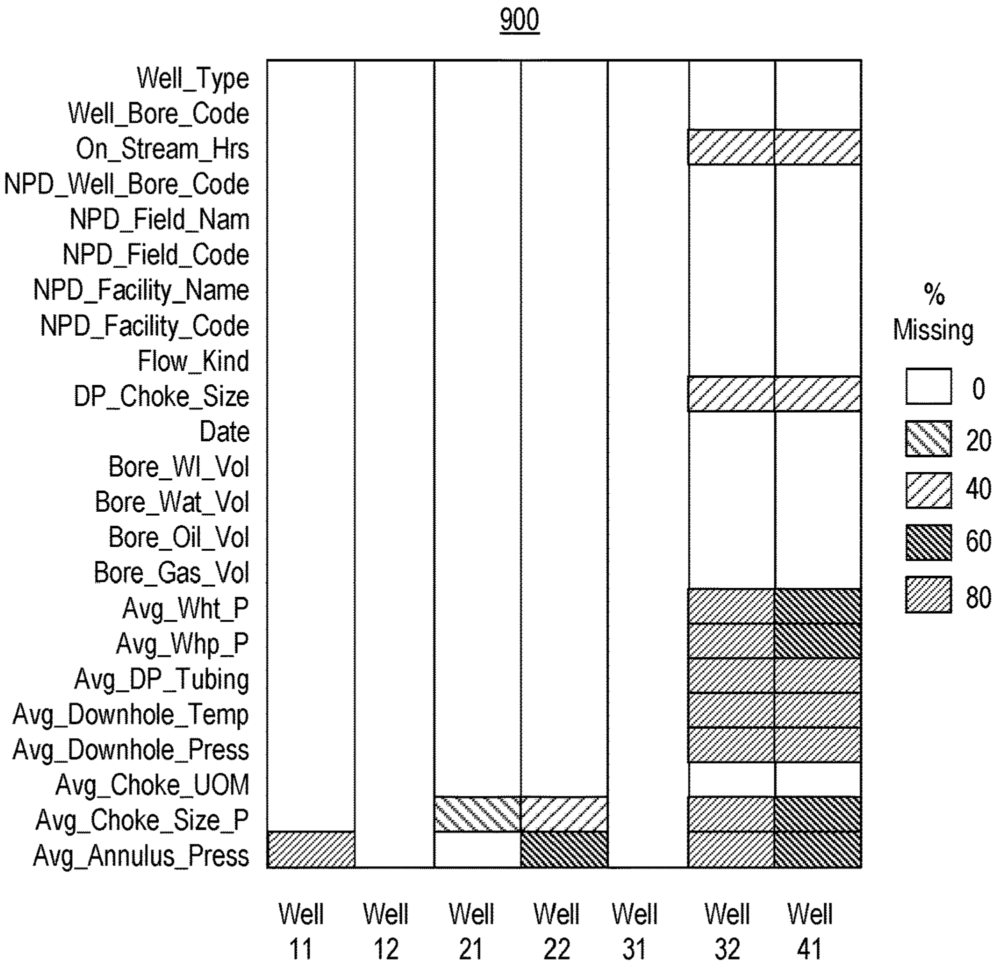
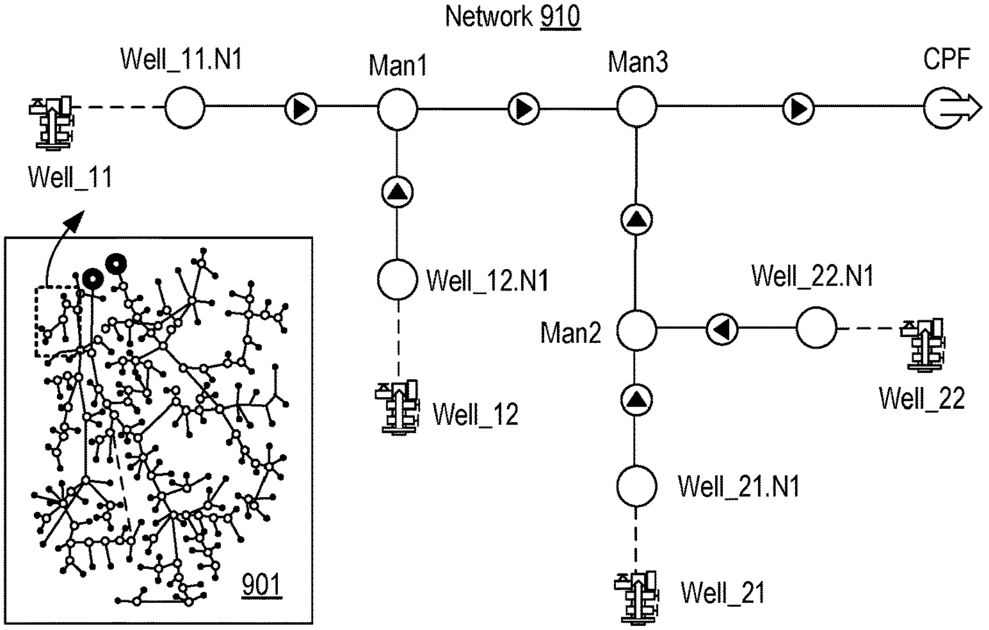
Fig. 9

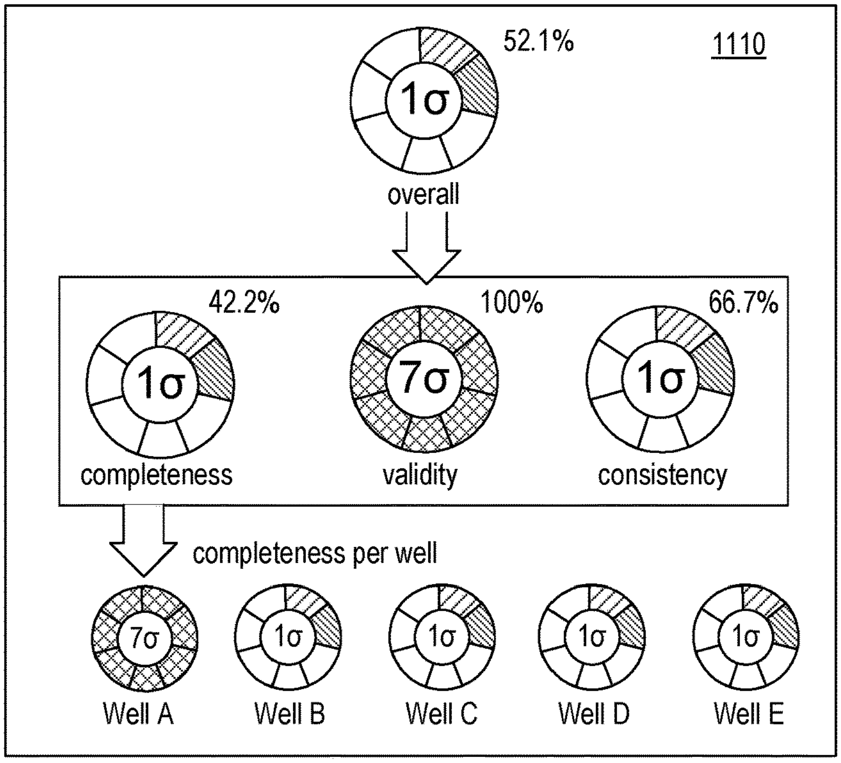
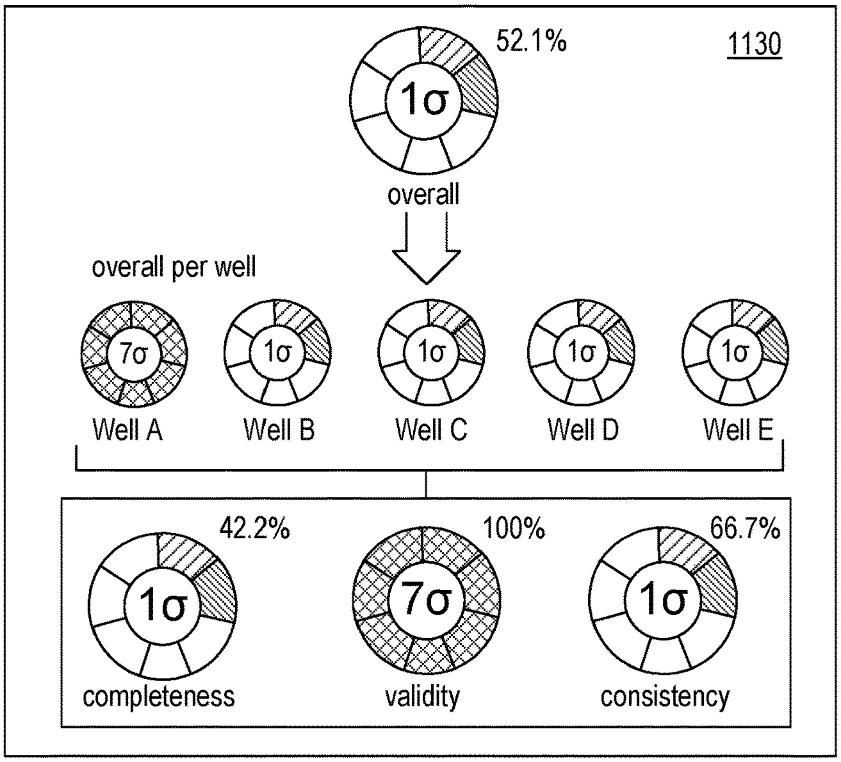
Fig. 11

System Components 1200

Flatliners 1202

No change in the last value

Gauge Scatter 1204

Can be detected by monitoring an increase in the variance of the data signal

Unrealistic gauge values 1206

Spikes/outlier detection & indicates if gauge requires maintenance or upgrade

Instrument out of range 1208

Data shows flat line for the duration that value is out of range

Trend deviation 1210

One can monitor whether the long term trend differs from the expected trend

No data coming in 1212

Missing data, wrong data, typos etc.

Manual data entry 1214

Application may have crashed and require a startup or communication is lost

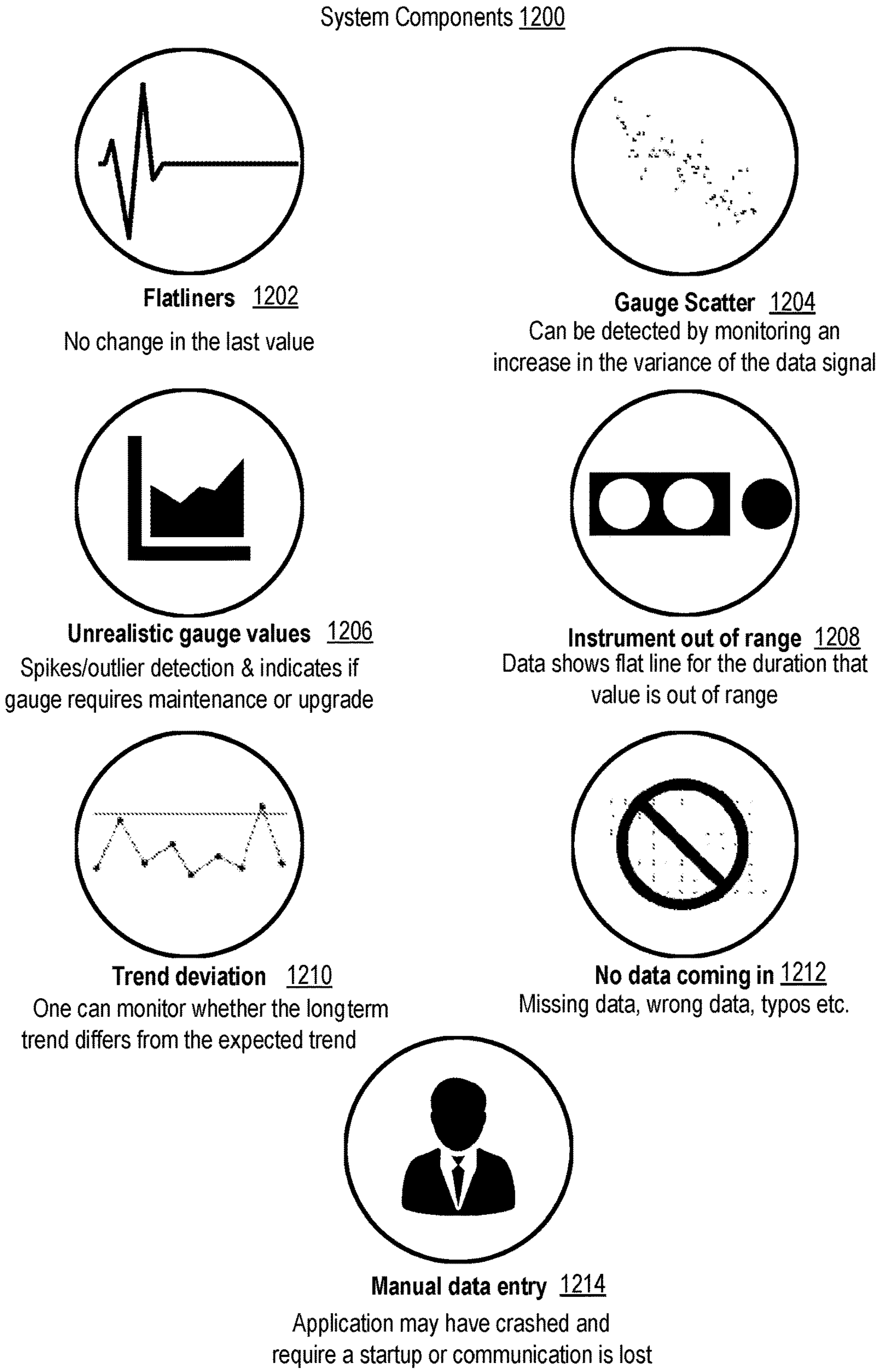

OVERALL

| | |
|---|---|
| ON_STREAM_HRS | AVG_DOWNHOLE_PRESSURE |
| 1386 | 0 |
| AVG_DOWNHOLE_TEMPERATURE | AVG_DP_TUBING |
| 0 | 0 |
| AVG_ANNULUS_PRESS | AVG_CHOKE_SIZE_P |
| 0 | 0 |
| AVG_WHP_P | AVG_WHT_P |
| 68 | 206 |
| DP_CHOKE_SIZE | |
| 165 | |

WELL X7

| | |
|---|---|
| ON_STREAM_HRS | AVG_DOWNHOLE_PRESSURE |
| 2 | 4 |
| AVG_DOWNHOLE_TEMPERATURE | AVG_DP_TUBING |
| 4 | 2 |
| AVG_ANNULUS_PRESS | AVG_CHOKE_SIZE_P |
| 0 | 0 |
| AVG_WHP_P | AVG_WHT_P |
| 2 | 4 |
| DP_CHOKE_SIZE | |
| 0 | |

1500

1600

1700

1800

DEVICES, SYSTEMS, AND METHODS FOR FIELD EQUIPMENT DATA MONITORING

CROSS-REFERENCE TO RELATED APPLICATIONS

This application is a National Stage Entry of International Application No. PCT/US2022/047649, filed Oct. 25, 2022, which is hereby incorporated by reference in its entirety.

BACKGROUND

A reservoir can be a subsurface formation that can be characterized at least in part by its porosity and fluid permeability. As an example, a reservoir may be part of a basin such as a sedimentary basin. A basin can be a depression (e.g., caused by plate tectonic activity, subsidence, etc.) in which sediments accumulate. As an example, where hydrocarbon source rocks occur in combination with appropriate depth and duration of burial, a petroleum system may develop within a basin, which may form a reservoir that includes hydrocarbon fluids (e.g., oil, gas, etc.). Various operations may be performed in the field to access such hydrocarbon fluids and/or produce such hydrocarbon fluids. For example, consider equipment operations where equipment may be controlled to perform one or more operations.

SUMMARY

A method can include receiving field equipment data from a source; detecting a data schema for the source; configuring a listener for the source according to a corresponding detected data schema to receive additional field equipment data; and assessing at least a portion of the additional field equipment data using an assessment engine to generate a hierarchy of data metric values for the source, where the hierarchy is customizable and navigable responsive to receipt of instructions. A system can include a processor; memory accessible to the processor; and processor-executable instructions stored in the memory to instruct the system to: receive field equipment data from a source; detect a data schema for the source; configure a listener for the source according to a corresponding detected data schema to receive additional field equipment data; and assess at least a portion of the additional field equipment data using an assessment engine to generate a hierarchy of data metric values for the source, where the hierarchy is customizable and navigable responsive to receipt of instructions. One or more computer-readable storage media can include processor-executable instructions to instruct a computing system to: receive field equipment data from a source; detect a data schema for the source; configure a listener for the source according to a corresponding detected data schema to receive additional field equipment data; and assess at least a portion of the additional field equipment data using an assessment engine to generate a hierarchy of data metric values for the source, where the hierarchy is customizable and navigable responsive to receipt of instructions. Various other apparatuses, systems, methods, etc., are also disclosed.

This summary is provided to introduce a selection of concepts that are further described below in the detailed description. This summary is not intended to identify key or essential features of the claimed subject matter, nor is it intended to be used as an aid in limiting the scope of the claimed subject matter.

BRIEF DESCRIPTION OF THE DRAWINGS

Features and advantages of the described implementations can be more readily understood by reference to the following description taken in conjunction with the accompanying drawings.

FIG. 4 illustrates examples of equipment and examples of simulators;

FIG. 9 illustrates an example of a graphical user interface;

FIG. 11 illustrates examples of graphical user interfaces;

FIG. 12 illustrates examples of system components;

DETAILED DESCRIPTION

This description is not to be taken in a limiting sense, but rather is made merely for the purpose of describing the general principles of the implementations. The scope of the described implementations should be ascertained with reference to the issued claims.

Figure 1:
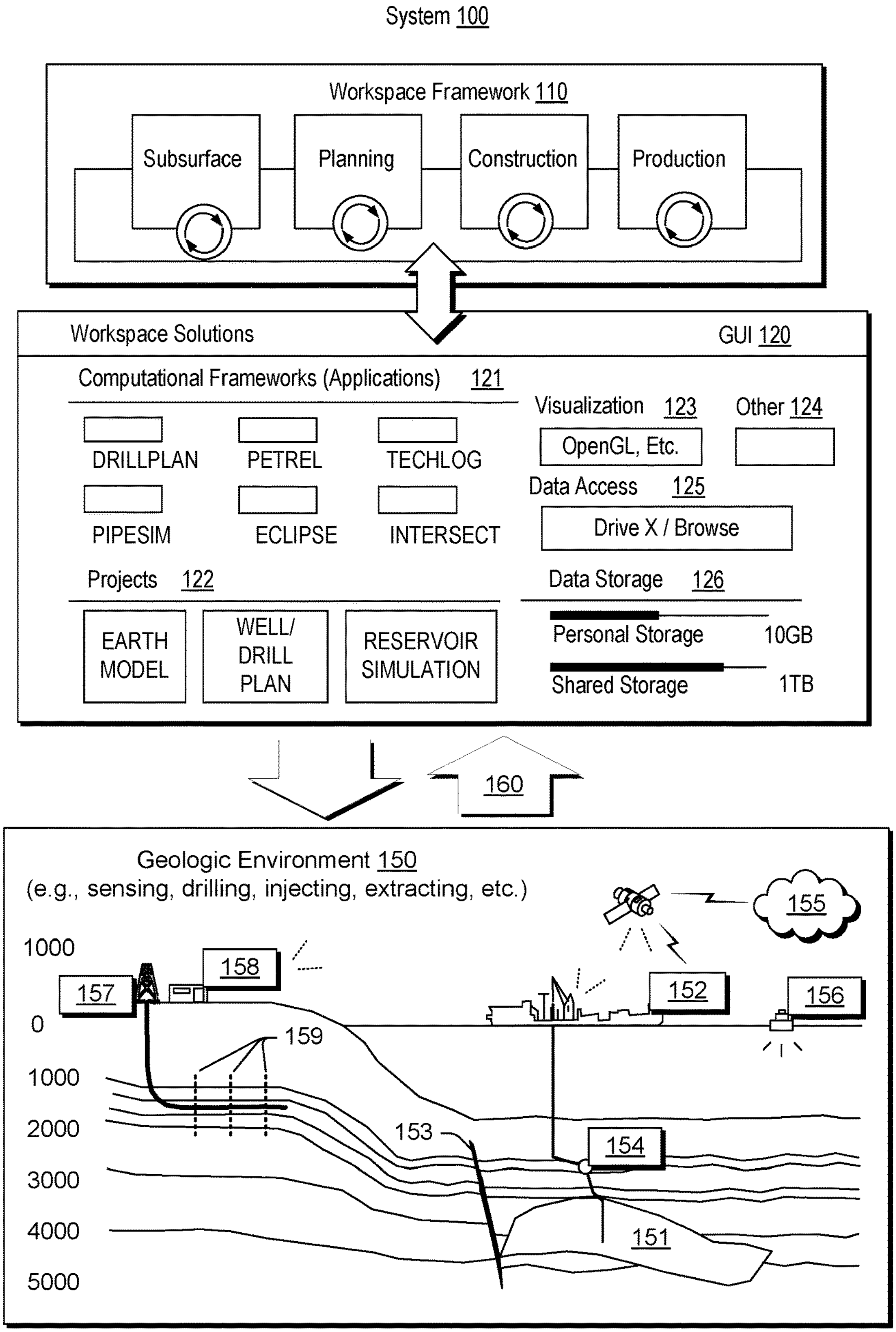
FIG. 1 illustrates an example system that includes various framework components associated with one or more geologic environments.

FIG. 1 shows an example of a system 100 that includes a workspace framework 110 that can provide for instantiation of, rendering of, interactions with, etc., a graphical user interface (GUI) 120. In the example of FIG. 1, the GUI 120 can include graphical controls for computational frameworks (e.g., applications) 121, projects 122, visualization 123, one or more other features 124, data access 125, and data storage 126.

In the example of FIG. 1, the workspace framework 110 may be tailored to a particular geologic environment such as an example geologic environment 150. For example, the geologic environment 150 may include layers (e.g., stratification) that include a reservoir 151 and that may be intersected by a fault 153. As an example, the geologic environment 150 may be outfitted with a variety of sensors, detectors, actuators, etc. For example, equipment 152 may include communication circuitry to receive and to transmit information with respect to one or more networks 155. Such information may include information associated with downhole equipment 154, which may be equipment to acquire information, to assist with resource recovery, etc. Other equipment 156 may be located remote from a wellsite and include sensing, detecting, emitting or other circuitry. Such equipment may include storage and communication circuitry to store and to communicate data, instructions, etc. As an example, one or more satellites may be provided for purposes of communications, data acquisition, etc. For example, FIG. 1 shows a satellite in communication with the network 155 that may be configured for communications, noting that the satellite may additionally or alternatively include circuitry for imagery (e.g., spatial, spectral, temporal, radiometric, etc.).

FIG. 1 also shows the geologic environment 150 as optionally including equipment 157 and 158 associated with a well that includes a substantially horizontal portion that may intersect with one or more fractures 159. For example, consider a well in a shale formation that may include natural fractures, artificial fractures (e.g., hydraulic fractures) or a combination of natural and artificial fractures. As an example, a well may be drilled for a reservoir that is laterally extensive. In such an example, lateral variations in properties, stresses, etc. may exist where an assessment of such variations may assist with planning, operations, etc. to develop a laterally extensive reservoir (e.g., via fracturing, injecting, extracting, etc.). As an example, the equipment 157 and/or 158 may include components, a system, systems, etc. for fracturing, seismic sensing, analysis of seismic data, assessment of one or more fractures, etc.

In the example of FIG. 1, the GUI 120 shows various features of a computational environment that can include various features of the DELFI environment, which may be referred to as the DELFI framework, which may be a framework of frameworks. As an example, the DELFI framework can include various other frameworks, which can include, for example, one or more types of models (e.g., simulation models, etc.). Some examples of frameworks can include the DRILLPLAN, PETREL, TECHLOG, PIPESIM, ECLIPSE, and INTERSECT frameworks (Schlumberger Limited, Houston, Texas).

The DRILLPLAN framework provides for digital well construction planning and includes features for automation of repetitive tasks and validation workflows, enabling improved quality drilling programs (e.g., digital drilling plans, etc.) to be produced quickly with assured coherency.

The PETREL framework is part of the DELFI cognitive E&P environment (Schlumberger Limited, Houston, Texas) for utilization in geosciences and geoengineering, for example, to analyze subsurface data from exploration, to development, to drilling, to production of fluid from a reservoir.

The TECHLOG framework can handle and process field and laboratory data for a variety of geologic environments (e.g., deepwater exploration, shale, etc.). The TECHLOG framework can structure wellbore data for analyses, planning, etc.

The PIPESIM simulator includes solvers that may provide simulation results such as, for example, multiphase flow results (e.g., from a reservoir to a wellhead and beyond, etc.), flowline and surface facility performance, etc. The PIPESIM simulator may be integrated, for example, with the AVOCET production operations framework (Schlumberger Limited, Houston Texas). As an example, a reservoir or reservoirs may be simulated with respect to one or more enhanced recovery techniques (e.g., consider a thermal process such as steam-assisted gravity drainage (SAGD), etc.). As an example, the PIPESIM simulator may be an optimizer that can optimize one or more operational scenarios at least in part via simulation of physical phenomena.

The ECLIPSE framework provides a reservoir simulator (e.g., as a computational framework) with numerical solutions for fast and accurate prediction of dynamic behavior for various types of reservoirs and development schemes.

The INTERSECT framework provides a high-resolution reservoir simulator for simulation of detailed geological features and quantification of uncertainties, for example, by creating accurate production scenarios and, with the integration of precise models of the surface facilities and field operations, the INTERSECT framework can produce reliable results, which may be continuously updated by real-time data exchanges (e.g., from one or more types of data acquisition equipment in the field that can acquire data during one or more types of field operations, etc.). The INTERSECT framework can provide completion configurations for complex wells where such configurations can be built in the field, can provide detailed chemical-enhanced-oil-recovery (EOR) formulations where such formulations can be implemented in the field, can analyze application of steam injection and other thermal EOR techniques for implementation in the field, advanced production controls in terms of reservoir coupling and flexible field management, and flexibility to script customized solutions for improved modeling and field management control. The INTERSECT framework, as with the other example frameworks, may be utilized as part of the DELFI cognitive E&P environment, for example, for rapid simulation of multiple concurrent cases. For example, a workflow may utilize one or more of the DELFI on demand reservoir simulation features.

The aforementioned DELFI environment provides various features for workflows as to subsurface analysis, planning, construction and production, for example, as illustrated in the workspace framework 110. As shown in FIG. 1, outputs from the workspace framework 110 can be utilized for directing, controlling, etc., one or more processes in the geologic environment 150 and, feedback 160, can be received via one or more interfaces in one or more forms (e.g., acquired data as to operational conditions, equipment conditions, environment conditions, etc.).

As an example, a workflow may progress to a geology and geophysics ("G&G") service provider, which may generate a well trajectory, which may involve execution of one or more G&G software packages.

In the example of FIG. 1, the visualization features 123 may be implemented via the workspace framework 110, for example, to perform tasks as associated with one or more of subsurface regions, planning operations, constructing wells and/or surface fluid networks, and producing from a reservoir.

As an example, a visualization process can implement one or more of various features that can be suitable for one or more web applications. For example, a template may involve use of the JAVASCRIPT object notation format (JSON) and/or one or more other languages/formats. As an example, a framework may include one or more converters. For example, consider a JSON to PYTHON converter and/or a PYTHON to JSON converter. In such an approach, one or more features of a framework that may be available in one language may be accessed via a converter. For example, consider the APACHE SPARK framework that can include features available in a particular language where a converter may convert code in another language to that particular language such that one or more of the features can be utilized. As an example, a production field may include various types of equipment, be operable with various frameworks, etc., where one or more languages may be utilized. In such an example, a converter may provide for feature flexibility and/or compatibility.

As an example, visualization features can provide for visualization of various earth models, properties, etc., in one or more dimensions. As an example, visualization features can provide for rendering of information in multiple dimensions, which may optionally include multiple resolution rendering. In such an example, information being rendered may be associated with one or more frameworks and/or one or more data stores. As an example, visualization features may include one or more control features for control of equipment, which can include, for example, field equipment that can perform one or more field operations. As an example, a workflow may utilize one or more frameworks to generate information that can be utilized to control one or more types of field equipment (e.g., drilling equipment, wireline equipment, fracturing equipment, etc.).

As to a reservoir model that may be suitable for utilization by a simulator, consider acquisition of seismic data as acquired via reflection seismology, which finds use in geophysics, for example, to estimate properties of subsurface formations. As an example, reflection seismology may provide seismic data representing waves of elastic energy (e.g., as transmitted by P-waves and S-waves, in a frequency range of approximately 1 Hz to approximately 100 Hz). Seismic data may be processed and interpreted, for example, to understand better composition, fluid content, extent and geometry of subsurface rocks. Such interpretation results can be utilized to plan, simulate, perform, etc., one or more operations for production of fluid from a reservoir (e.g., reservoir rock, etc.).

Field acquisition equipment may be utilized to acquire seismic data, which may be in the form of traces where a trace can include values organized with respect to time and/or depth (e.g., consider 1D, 2D, 3D or 4D seismic data). For example, consider acquisition equipment that acquires digital samples at a rate of one sample per approximately 4 ms. Given a speed of sound in a medium or media, a sample rate may be converted to an approximate distance. For example, the speed of sound in rock may be on the order of around 5 km per second. Thus, a sample time spacing of approximately 4 ms would correspond to a sample "depth" spacing of about 10 meters (e.g., assuming a path length from source to boundary and boundary to sensor). As an example, a trace may be about 4 seconds in duration; thus, for a sampling rate of one sample at about 4 ms intervals, such a trace would include about 1000 samples where later acquired samples correspond to deeper reflection boundaries. If the 4 second trace duration of the foregoing example is divided by two (e.g., to account for reflection), for a vertically aligned source and sensor, a deepest boundary depth may be estimated to be about 10 km (e.g., assuming a speed of sound of about 5 km per second).

As an example, a model may be a simulated version of a geologic environment. As an example, a simulator may include features for simulating physical phenomena in a geologic environment based at least in part on a model or models. A simulator, such as a reservoir simulator, can simulate fluid flow in a geologic environment based at least in part on a model that can be generated via a framework that receives seismic data. A simulator can be a computerized system (e.g., a computing system) that can execute instructions using one or more processors to solve a system of equations that describe physical phenomena subject to various constraints. In such an example, the system of equations may be spatially defined (e.g., numerically discretized) according to a spatial model that that includes layers of rock, geobodies, etc., that have corresponding positions that can be based on interpretation of seismic and/or other data. A spatial model may be a cell-based model where cells are defined by a grid (e.g., a mesh). A cell in a cell-based model can represent a physical area or volume in a geologic environment where the cell can be assigned physical properties (e.g., permeability, fluid properties, etc.) that may be germane to one or more physical phenomena (e.g., fluid volume, fluid flow, pressure, etc.). A reservoir simulation model can be a spatial model that may be cell-based.

A simulator can be utilized to simulate the exploitation of a real reservoir, for example, to examine different productions scenarios to find an optimal one before production or further production occurs. A reservoir simulator does not provide an exact replica of flow in and production from a reservoir at least in part because the description of the reservoir and the boundary conditions for the equations for flow in a porous rock are generally known with an amount of uncertainty. Certain types of physical phenomena occur at a spatial scale that can be relatively small compared to size of a field. A balance can be struck between model scale and computational resources that results in model cell sizes being of the order of meters; rather than a lesser size (e.g., a level of detail of pores). A modeling and simulation workflow for multiphase flow in porous media (e.g., reservoir rock, etc.) can include generalizing real micro-scale data from macro scale observations (e.g., seismic data and well data) and upscaling to a manageable scale and problem size. Uncertainties can exist in input data and solution procedure such that simulation results too are to some extent uncertain. A process known as history matching can involve comparing simulation results to actual field data acquired during production of fluid from a field. Information gleaned from history matching, can provide for adjustments to a model, data, etc., which can help to increase accuracy of simulation.

As an example, a simulator may utilize various types of constructs, which may be referred to as entities. Entities may include earth entities or geological objects such as wells, surfaces, reservoirs, etc. Entities can include virtual representations of actual physical entities that may be reconstructed for purposes of simulation. Entities may include entities based on data acquired via sensing, observation, etc. (e.g., consider entities based at least in part on seismic data and/or other information). As an example, an entity may be characterized by one or more properties (e.g., a geometrical pillar grid entity of an earth model may be characterized by a porosity property, etc.). Such properties may represent one or more measurements (e.g., acquired data), calculations, etc.

As an example, a simulator may utilize an object-based software framework, which may include entities based on pre-defined classes to facilitate modeling and simulation. As an example, an object class can encapsulate reusable code and associated data structures. Object classes can be used to instantiate object instances for use by a program, script, etc. For example, borehole classes may define objects for representing boreholes based on well data. A model of a basin, a reservoir, etc. may include one or more boreholes where a borehole may be, for example, for measurements, injection, production, etc. As an example, a borehole may be a wellbore of a well, which may be a completed well (e.g., for production of a resource from a reservoir, for injection of material, etc.).

While several simulators are illustrated in the example of FIG. 1, one or more other simulators may be utilized, additionally or alternatively. For example, consider the VISAGE geomechanics simulator (Schlumberger Limited, Houston Texas) or the PETROMOD simulator (Schlumberger Limited, Houston Texas), etc. The VISAGE simulator includes finite element numerical solvers that may provide simulation results such as, for example, results as to compaction and subsidence of a geologic environment, well and completion integrity in a geologic environment, cap-rock and fault-seal integrity in a geologic environment, fracture behavior in a geologic environment, thermal recovery in a geologic environment, $CO_2$ disposal, etc. The PETROMOD framework provides petroleum systems modeling capabilities that can combine one or more of seismic, well, and geological information to model the evolution of a sedimentary basin. The PETROMOD framework can predict if, and how, a reservoir has been charged with hydrocarbons, including the source and timing of hydrocarbon generation, migration routes, quantities, and hydrocarbon type in the subsurface or at surface conditions. The MANGROVE simulator (Schlumberger Limited, Houston, Texas) provides for optimization of stimulation design (e.g., stimulation treatment operations such as hydraulic fracturing) in a reservoir-centric environment. The MANGROVE framework can combine scientific and experimental work to predict geomechanical propagation of hydraulic fractures, reactivation of natural fractures, etc., along with production forecasts within 3D reservoir models (e.g., production from a drainage area of a reservoir where fluid moves via one or more types of fractures to a well and/or from a well). The MANGROVE framework can provide results pertaining to heterogeneous interactions between hydraulic and natural fracture networks, which may assist with optimization of the number and location of fracture treatment stages (e.g., stimulation treatment(s)), for example, to increased perforation efficiency and recovery.

The PETREL framework provides components that allow for optimization of exploration and development operations. The PETREL framework includes seismic to simulation software components that can output information for use in increasing reservoir performance, for example, by improving asset team productivity. Through use of such a framework, various professionals (e.g., geophysicists, geologists, and reservoir engineers) can develop collaborative workflows and integrate operations to streamline processes (e.g., with respect to one or more geologic environments, etc.). Such a framework may be considered an application (e.g., executable using one or more devices) and may be considered a data-driven application (e.g., where data is input for purposes of modeling, simulating, etc.).

As mentioned, a framework may be implemented within or in a manner operatively coupled to the DELFI cognitive exploration and production (E&P) environment (Schlumberger, Houston, Texas), which is a secure, cognitive, cloud-based collaborative environment that integrates data and workflows with digital technologies, such as artificial intelligence and machine learning. As an example, such an environment can provide for operations that involve one or more frameworks. The DELFI environment may be referred to as the DELFI framework, which may be a framework of frameworks. As an example, the DELFI framework can include various other frameworks, which can include, for example, one or more types of models (e.g., simulation models, etc.).

As an example, a framework may include various toolkit features. For example, consider Python toolkit features. Such toolkit features can provide extensibility for one or more additional functionalities for a framework or frameworks.

Figure 2:
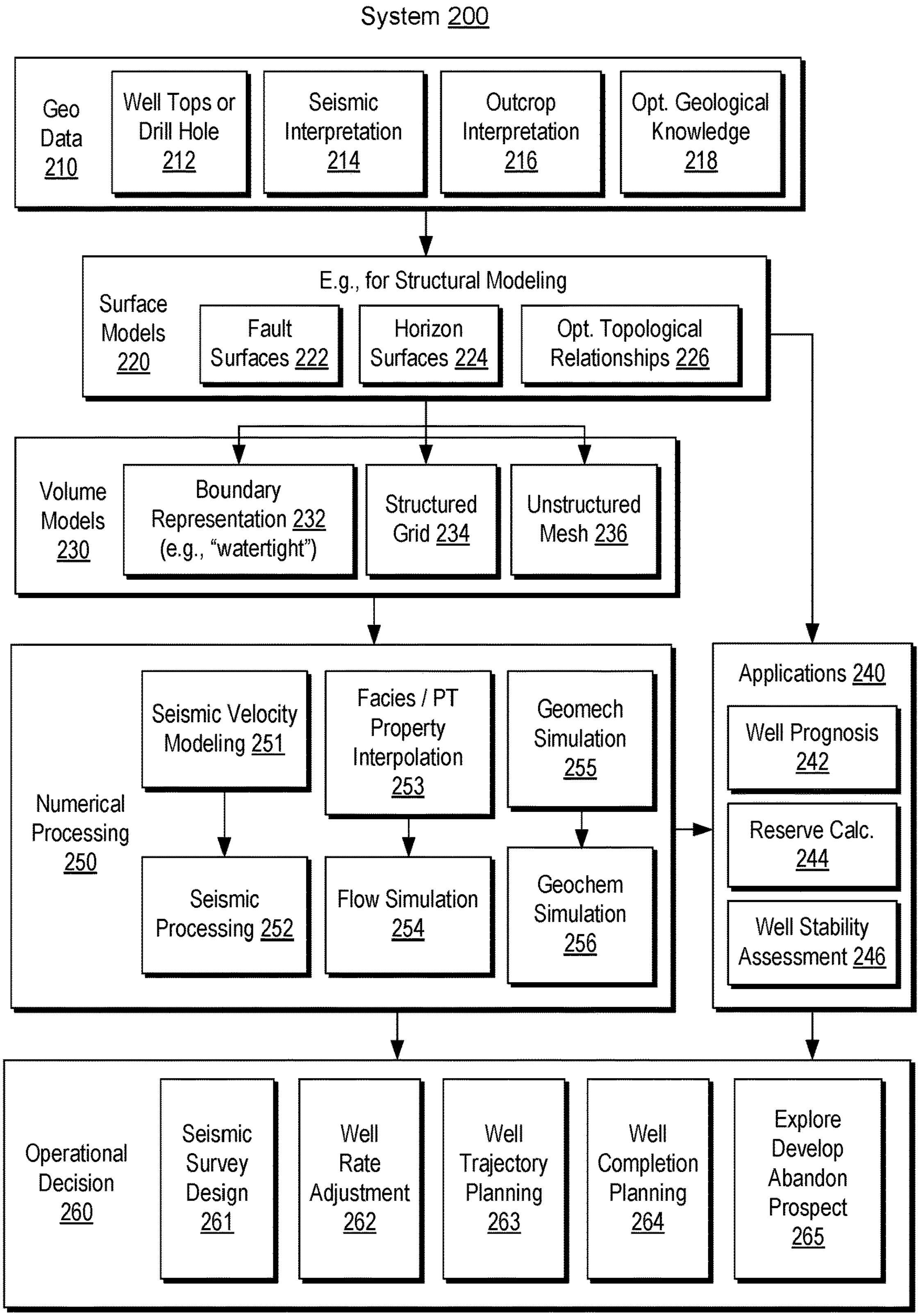
FIG. 2 illustrates an example of a system.

FIG. 2 shows an example of a system 200 that can be operatively coupled to one or more databases, data streams, etc. For example, one or more pieces of field equipment, laboratory equipment, computing equipment (e.g., local and/or remote), etc., can provide and/or generate data that may be utilized in the system 200.

As shown, the system 200 can include a geological/geophysical data block 210, a surface models block 220 (e.g., for one or more structural models), a volume modules block 230, an applications block 240, a numerical processing block 250 and an operational decision block 260. As shown in the example of FIG. 2, the geological/geophysical data block 210 can include data from well tops or drill holes 212, data from seismic interpretation 214, data from outcrop interpretation and optionally data from geological knowledge. As to the surface models block 220, it may provide for creation, editing, etc. of one or more surface models based on, for example, one or more of fault surfaces 222, horizon surfaces 224 and optionally topological relationships 226. As to the volume models block 230, it may provide for creation, editing, etc. of one or more volume models based on, for example, one or more of boundary representations 232 (e.g., to form a watertight model), structured grids 234 and unstructured meshes 236.

As shown in the example of FIG. 2, the system 200 may allow for implementing one or more workflows, for example, where data of the data block 210 are used to create, edit, etc. one or more surface models of the surface models block 220, which may be used to create, edit, etc. one or more volume models of the volume models block 230. As indicated in the example of FIG. 2, the surface models block 220 may provide one or more structural models, which may be input to the applications block 240. For example, such a structural model may be provided to one or more applications, optionally without performing one or more processes of the volume models block 230 (e.g., for purposes of numerical processing by the numerical processing block 250). Accordingly, the system 200 may be suitable for one or more workflows for structural modeling (e.g., optionally without performing numerical processing per the numerical processing block 250).

As to the applications block 240, it may include applications such as a well prognosis application 242, a reserve calculation application 244 and a well stability assessment application 246. As to the numerical processing block 250, it may include a process for seismic velocity modeling 251 followed by seismic processing 252, a process for facies and petrophysical property interpolation 253 followed by flow simulation 254, and a process for geomechanical simulation 255 followed by geochemical simulation 256. As indicated, as an example, a workflow may proceed from the volume models block 230 to the numerical processing block 250 and then to the applications block 240 and/or to the operational decision block 260. As another example, a workflow may proceed from the surface models block 220 to the applications block 240 and then to the operational decisions block 260 (e.g., consider an application that operates using a structural model).

In the example of FIG. 2, the operational decisions block 260 may include a seismic survey design process 261, a well rate adjustment process 252, a well trajectory planning process 263, a well completion planning process 264 and a process for one or more prospects, for example, to decide whether to explore, develop, abandon, etc. a prospect.

Referring again to the data block 210, the well tops or drill hole data 212 may include spatial localization, and optionally surface dip, of an interface between two geological formations or of a subsurface discontinuity such as a geological fault; the seismic interpretation data 214 may include a set of points, lines or surface patches interpreted from seismic reflection data, and representing interfaces between media (e.g., geological formations in which seismic wave velocity differs) or subsurface discontinuities; the outcrop interpretation data 216 may include a set of lines or points, optionally associated with measured dip, representing boundaries between geological formations or geological faults, as interpreted on the earth surface; and the geological knowledge data 218 may include, for example knowledge of the paleo-tectonic and sedimentary evolution of a region.

As to a structural model, it may be, for example, a set of gridded or meshed surfaces representing one or more interfaces between geological formations (e.g., horizon surfaces) or mechanical discontinuities (fault surfaces) in the subsurface. As an example, a structural model may include some information about one or more topological relationships between surfaces (e.g. fault A truncates fault B, fault B intersects fault C, etc.).

As to the one or more boundary representations 232, they may include a numerical representation in which a subsurface model is partitioned into various closed units representing geological layers and fault blocks where an individual unit may be defined by its boundary and, optionally, by a set of internal boundaries such as fault surfaces.

As to the one or more structured grids 234, it may include a grid that partitions a volume of interest into different elementary volumes (cells), for example, that may be indexed according to a pre-defined, repeating pattern. As to the one or more unstructured meshes 236, it may include a mesh that partitions a volume of interest into different elementary volumes, for example, that may not be readily indexed following a pre-defined, repeating pattern (e.g., consider a Cartesian cube with indexes I, J, and K, along x, y, and z axes).

As to the seismic velocity modeling 251, it may include calculation of velocity of propagation of seismic waves (e.g., where seismic velocity depends on type of seismic wave and on direction of propagation of the wave). As to the seismic processing 252, it may include a set of processes allowing identification of localization of seismic reflectors in space, physical characteristics of the rocks in between these reflectors, etc.

As to the facies and petrophysical property interpolation 253, it may include an assessment of type of rocks and of their petrophysical properties (e.g. porosity, permeability), for example, optionally in areas not sampled by well logs or coring. As an example, such an interpolation may be constrained by interpretations from log and core data, and by prior geological knowledge.

As to the flow simulation 254, as an example, it may include simulation of flow of hydro-carbons in the subsurface, for example, through geological times (e.g., in the context of petroleum systems modeling, when trying to predict the presence and quality of oil in an un-drilled formation) or during the exploitation of a hydrocarbon reservoir (e.g., when some fluids are pumped from or into the reservoir).

As to geomechanical simulation 255, it may include simulation of the deformation of rocks under boundary conditions. Such a simulation may be used, for example, to assess compaction of a reservoir (e.g., associated with its depletion, when hydrocarbons are pumped from the porous and deformable rock that composes the reservoir). As an example a geomechanical simulation may be used for a variety of purposes such as, for example, prediction of fracturing, reconstruction of the paleo-geometries of the reservoir as they were prior to tectonic deformations, etc.

As to geochemical simulation 256, such a simulation may simulate evolution of hydrocarbon formation and composition through geological history (e.g., to assess the likelihood of oil accumulation in a particular subterranean formation while exploring new prospects).

As to the various applications of the applications block 240, the well prognosis application 242 may include predicting type and characteristics of geological formations that may be encountered by a drill-bit, and location where such rocks may be encountered (e.g., before a well is drilled); the reserve calculations application 244 may include assessing total amount of hydrocarbons or ore material present in a subsurface environment (e.g., and estimates of which proportion can be recovered, given a set of economic and technical constraints); and the well stability assessment application 246 may include estimating risk that a well, already drilled or to-be-drilled, will collapse or be damaged due underground stress.

As to the operational decision block 260, the seismic survey design process 261 may include deciding where to place seismic sources and receivers to optimize the coverage and quality of the collected seismic information while minimizing cost of acquisition; the well rate adjustment process 262 may include controlling injection and production well schedules and rates (e.g., to maximize recovery and production); the well trajectory planning process 263 may include designing a well trajectory to maximize potential recovery and production while minimizing drilling risks and costs; the well trajectory planning process 264 may include selecting proper well tubing, casing and completion (e.g., to meet expected production or injection targets in specified reservoir formations); and the prospect process 265 may include decision making, in an exploration context, to continue exploring, start producing or abandon prospects (e.g., based on an integrated assessment of technical and financial risks against expected benefits).

The system 200 can include and/or can be operatively coupled to a system such as the system 100 of FIG. 1. For example, the workspace framework 110 may provide for instantiation of, rendering of, interactions with, etc., the graphical user interface (GUI) 120 to perform one or more actions as to the system 200. In such an example, access may be provided to one or more frameworks (e.g., DRILLPLAN, PETREL, TECHLOG, PIPESIM, ECLIPSE, INTERSECT, etc.). One or more frameworks may provide for geo data acquisition as in block 210, for structural modeling as in block 220, for volume modeling as in block 230, for running an application as in block 240, for numerical processing as in block 250, for operational decision making as in block 260, etc.

As an example, the system 200 may provide for monitoring data such as production data and/or production-related data. For example, consider the operational decision block 260 as including capabilities for monitoring, analyzing, etc., such data for purposes of making one or more operational decisions, which may include controlling equipment, revising operations, revising a plan, etc. In such an example, data may be fed into the system 200 at one or more points where the quality of the data may be of particular interest. For example, data quality may be characterized by one or more metrics where data quality may provide indications as to trust, probabilities, etc., which may be germane to operational decision making and/or other decision making.

Figure 3:
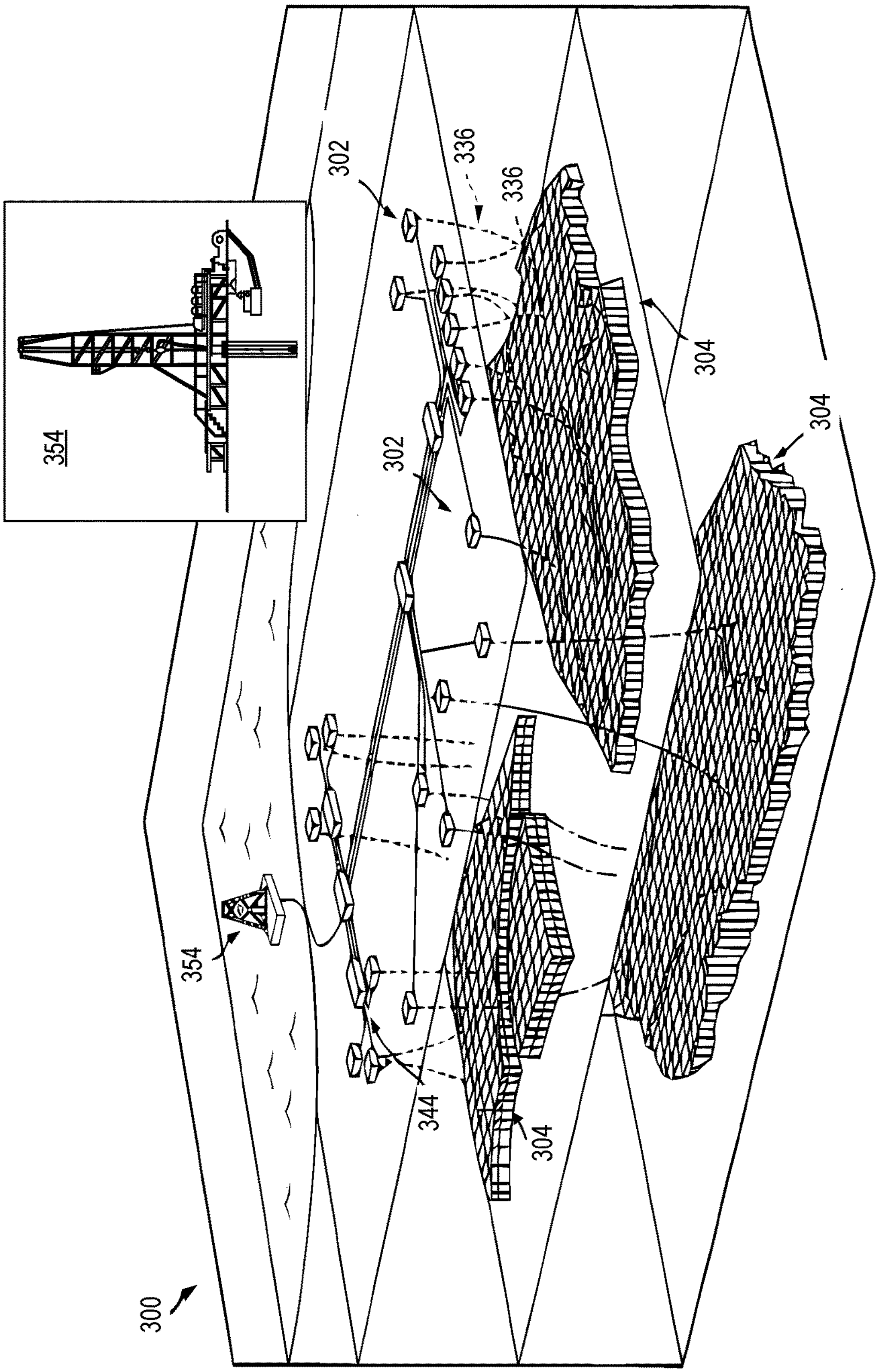
FIG. 3 illustrates an example of a geologic environment and examples of equipment.

FIG. 3 shows an example of a geologic environment 300 as including various types of equipment and features. As shown, the geologic environment 300 includes a plurality of wellsites 302, which may be operatively connected to a processing facility. In the example of FIG. 3, individual wellsites 302 can include equipment that can form individual wellbores 336. Such wellbores can extend through subterranean formations including one or more reservoirs 304. Such reservoirs 304 can include fluids, such as hydrocarbons. As an example, wellsites can provide for flow of fluid from one or more reservoirs and pass them to one or more processing facilities via one or more surface networks 344. As an example, a surface network can include tubing and control mechanisms for controlling flow of fluids from a wellsite to a processing facility. In the example of FIG. 3, a rig 354 is shown, which may be an offshore rig or an onshore rig. As an example, a rig can be utilized to drill a borehole that can be completed to be a wellbore where the wellbore can be in fluid communication with a reservoir such that fluid may be produced from the reservoir.

As mentioned, the geologic environment 300 can include various types of equipment and features. As an example, consider one or more sensors that can be located within the geologic environment 300 for purposes of sensing physical phenomena (e.g., pressure, temperature, flow rates, composition, density, viscosity, solids, flare character, compaction, etc.). As an example, equipment may include production equipment such as a choke valve where individual wells may each include a choke valve that can regulate flow of fluid from a well. As an example, equipment may include artificial lift equipment that can facilitate production of fluid from a reservoir. Artificial lift can be implemented as part of a production strategy whereby energy can be added to fluid to help initiate and/or improve production. Artificial lift equipment may utilizes one or more of various operating principles, which can include, for example, rod pumping, gas lift, electric submersible pumps, etc. Referring again to FIG. 2, the operational decision block 260 may include planning for artificial lift, call for artificial lift, controlling one or more artificial lift operations, etc.

As an example, enhanced oil recovery (EOR) may be employed in the geologic environment 300, which may be based on one or more outputs of a system such as the system 200, the system 100, etc. EOR can aim to alter fluid properties, particularly properties of hydrocarbons. As an example, EOR may aim to restore formation pressure and/or improve oil displacement or fluid flow in a reservoir. EOR may include chemical flooding (e.g., alkaline flooding or micellar-polymer flooding), miscible displacement (e.g., carbon dioxide injection or hydrocarbon injection), thermal recovery (e.g., steam flood or in-situ combustion), etc. EOR may depend on factors such as reservoir temperature, pressure, depth, net pay, permeability, residual oil and water saturations, porosity and fluid properties such as oil API gravity and viscosity. Enhanced oil recovery may be referred to at times as improved oil recovery or tertiary recovery.

FIG. 4 shows an example of a portion of a geologic environment 401 and an example of a larger portion of a geologic environment 410. As shown, a geologic environment can include one or more reservoirs 411-1 and 411-2, which may be faulted by faults 412-1 and 412-2 and which may include oil (o), gas (g) and/or water (w). FIG. 4 also shows some examples of offshore equipment 414 for oil and gas operations related to the reservoirs 411-1 and 411-2 and onshore equipment 416 for oil and gas operations related to the reservoir 411-1. As an example, a system may be implemented for operations associated with one or more of such reservoirs.

As to the geologic environment 401, FIG. 4 shows a schematic view where the geologic environment 401 can include various types of equipment. As shown in FIG. 4, the environment 401 can include a wellsite 402 and a fluid network 444. In the example of FIG. 4, the wellsite 402 includes a wellbore 406 extending into earth as completed and prepared for production of fluid from a reservoir 411 (e.g., one of the reservoirs 411-1 or 411-2).

In the example of FIG. 4, wellbore production equipment 464 extends from a wellhead 466 of the wellsite 402 and to the reservoir 411 to draw fluid to the surface. As shown, the wellsite 402 is operatively connected to the fluid network 444 via a transport line 461. As indicated by various arrows, fluid can flow from the reservoir 411, through the wellbore 406 and onto the fluid network 444. Fluid can then flow from the fluid network 444, for example, to one or more fluid processing facilities.

In the example of FIG. 4, sensors(S) are located, for example, to monitor various parameters during operations. The sensors(S) may measure, for example, pressure, temperature, flowrate, composition, and other parameters of the reservoir, wellbore, gathering network, process facilities and/or other portions of an operation. As an example, the sensors(S) may be operatively connected to a surface unit (e.g., to instruct the sensors to acquire data, to collect data from the sensors, etc.).

In the example of FIG. 4, a surface unit can include computer facilities, such as a memory device, a controller, one or more processors, and display unit (e.g., for managing data, visualizing results of an analysis, etc.). As an example, data may be collected in the memory device and processed by the processor(s) (e.g., for analysis, etc.). As an example, data may be collected from the sensors(S) and/or by one or more other sources. For example, data may be supplemented by historical data collected from other operations, user inputs, etc. As an example, analyzed data may be used to in a decision making process.

As an example, a transceiver may be provided to allow communications between a surface unit and one or more pieces of equipment in the environment 401. For example, a controller may be used to actuate mechanisms in the environment 401 via the transceiver, optionally based on one or more decisions of a decision making process. In such a manner, equipment in the environment 401 may be selectively adjusted based at least in part on collected data. Such adjustments may be made, for example, automatically based on computer protocol, manually by an operator or both. As an example, one or more well plans may be adjusted (e.g., to select optimum operating conditions, to avoid problems, etc.).

To facilitate data analyses, one or more simulators may be implemented (e.g., optionally via the surface unit or other unit, system, etc.). As an example, data fed into one or more simulators may be historical data, real time data or combinations thereof. As an example, simulation through one or more simulators may be repeated or adjusted based on the data received.

In the example of FIG. 4, simulators can include a reservoir simulator 428, a wellbore simulator 430, a surface network simulator 432, a process simulator 434 and an economics simulator 436. As an example, the reservoir simulator 428 may be configured to solve for hydrocarbon flow rate through a reservoir and into one or more wellbores.

As an example, the wellbore simulator 430 and surface network simulator 432 may be configured to solve for hydrocarbon flow rate through a wellbore and a surface gathering network of pipelines. As to the process simulator 434, it may be configured to model a processing plant where fluid containing hydrocarbons is separated into its constituent components (e.g., methane, ethane, propane, etc.), for example, and prepared for further distribution (e.g., transport via road, rail, pipe, etc.) and optionally sale. As an example, the economics simulator 436 may be configured to model costs associated with at least part of an operation. For example, consider MERAK framework (Schlumberger Limited, Houston, Texas), which may provide for economic analyses.

As an example, a system can include and/or be operatively coupled to one or more of the simulators 428, 430, 432, 434 and 436 of FIG. 4. As an example, such simulators may be associated with frameworks and/or may be considered tools (see, e.g., the system 100 of FIG. 1, etc.). Various pieces of equipment in the example geologic environments 401 and 410 of FIG. 4 may be operatively coupled to one or more systems, one or more frameworks, etc. As an example, one or more of the sensors(S) may be operatively coupled to one or more networks (e.g., wired and/or wireless) for transmission of data, which, as explained, may include data indicative of production. As shown, a sensor(S) may be utilized for acquisition of downhole data and/or surface data, which can include data relevant to production (e.g., flow rate, temperature, pressure, composition, etc.). Such data may be utilized in a system such as, for example, the system 200 of FIG. 2 for operational decision making, etc.

As an example, a system may be a DQM (Data Quality Monitoring) system that can utilize six sigma principles for real time production operations data using distributed computing.

Figure 5:
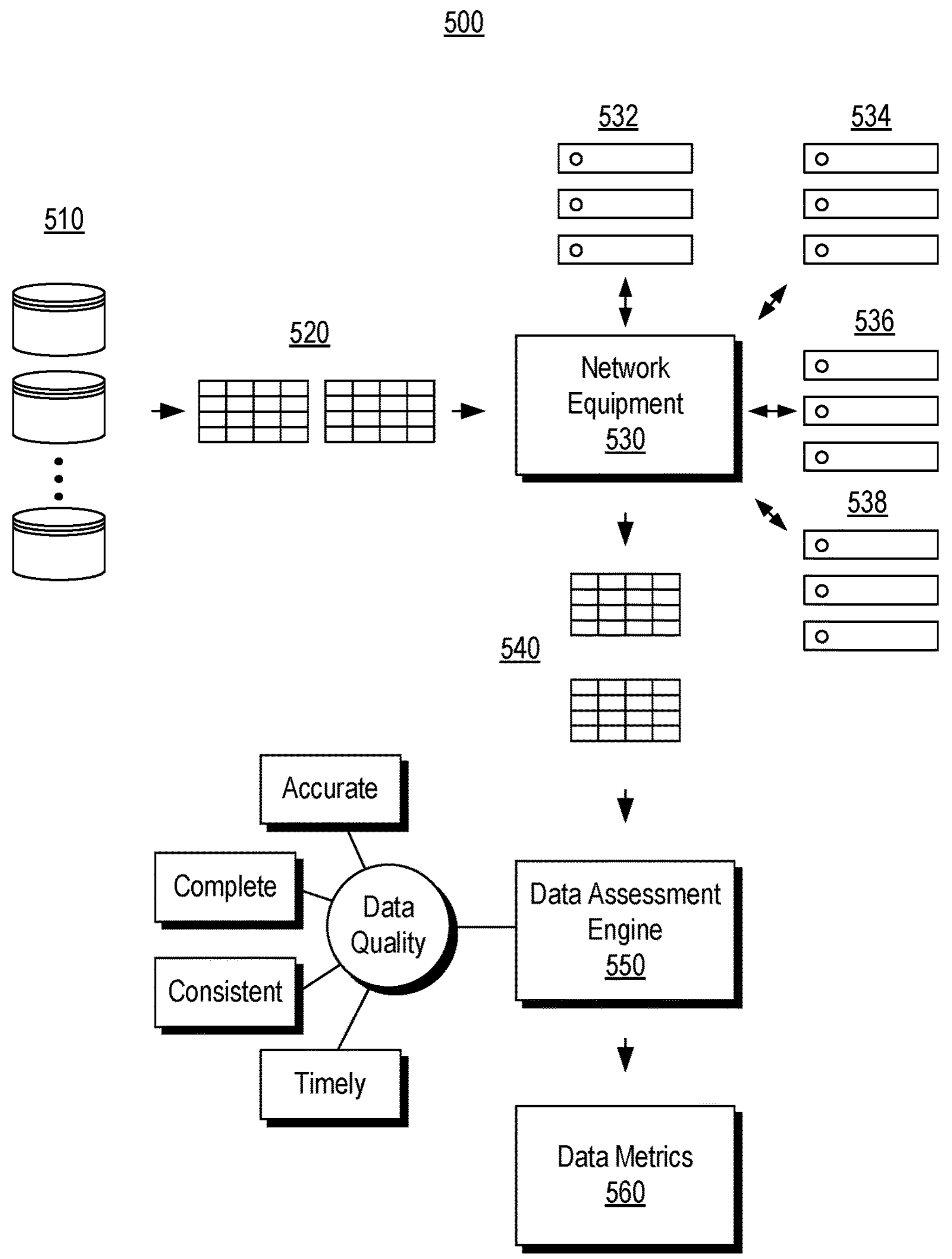
FIG. 5 illustrates an example of a system.

FIG. 5 shows an example of a system 500 that shows data sources 510 and mini-batch data 520 that can flow from one of the data sources as an input source into a real-time distributed computation framework that includes network equipment 530 operatively coupled to computation/memory equipment 532, 534, 536 and 538, etc. As shown, data 540 can flow to a data assessment engine 550, which can include data quality score computation features and features that can aggregate data metrics in real-time for the chunks (batches) of data 540. As an example, such data metrics may be consumed by one or more machine and/or human layers such as, for example, one or more presentation layers (e.g., user customizable presentation layer, etc.).

As an example, an input data source may be a static file or data stream, where data formats supported may include, for example, one or more of JSON, CSV, etc.

As an example, a distributed real-time computational framework may include one or more of cloud and on-premises distributed framework components. As an example, a framework can include one or more features of the APACHE SPARK framework, which is capable of handling and distributing computation across multiple nodes and for producing a response in real-time (e.g., near real-time that can be with a latency that can be less than an interval of a data rate or acquisition rate of one or more pieces of equipment, etc., which may be in the field, in a laboratory, etc.).

As an example, a system can include a data quality score computation engine, which may be or may be part of the data assessment engine 550 of the system 500 of FIG. 5. For example, consider a microservice that can take mini-batch data of defects and/or opportunities and generate one or more types of data metrics (e.g., a six-sigma computation score, etc.).

As an example, a system can include one or more consumption, distribution, presentation, etc., types of layers. For example, consider a controller that is operatively coupled to one or more sensors, one or more pieces of equipment, one or more communication circuits, etc. In such an example, a control action may be taken in response to a data metric being above, below or at a certain value (e.g., a threshold, etc.). For example, consider taking a sensor off-line where the sensor is generating data of poor quality and/or, for example, implementing a digital twin (e.g., an avatar, etc.) that can generate substitute data (e.g., via one or more AI, via one or more machine models, etc.). As an example, where data include measurements of code and/or other types security data (e.g., via a trusted platform module, etc.), one or more data quality issues may indicate a possible system breach, which may trigger one or more actions (e.g., shutting down equipment, moving to a backup system, etc.).

As an example, as to a user customizable hierarchical presentation, consider, for example, a presentation layer that one or more end users can customize from a default view to drill down a hierarchy, arrange elements of the view in different combination(s), etc. In such an example, a view may be associated with one or more actionable insights.

As explained, mini-batch data can flow from an input source into a real-time distributed computation framework that can filter the data for defects where filtered data can be fed into a data assessment engine (e.g., a quality score computation engine) that can include features to aggregate data metrics in real-time for the chunks (batches) of data. As explained, metrics may be consumed by one or more types of machines, humans, etc. (e.g., consider a user customizable hierarchical presentation layer).

As an example, a type of data metric can be, for example, a completeness data metric, which, for example, may be computed on a real-time data stream of one or more types of data such as, for example, production data.

Figure 6:
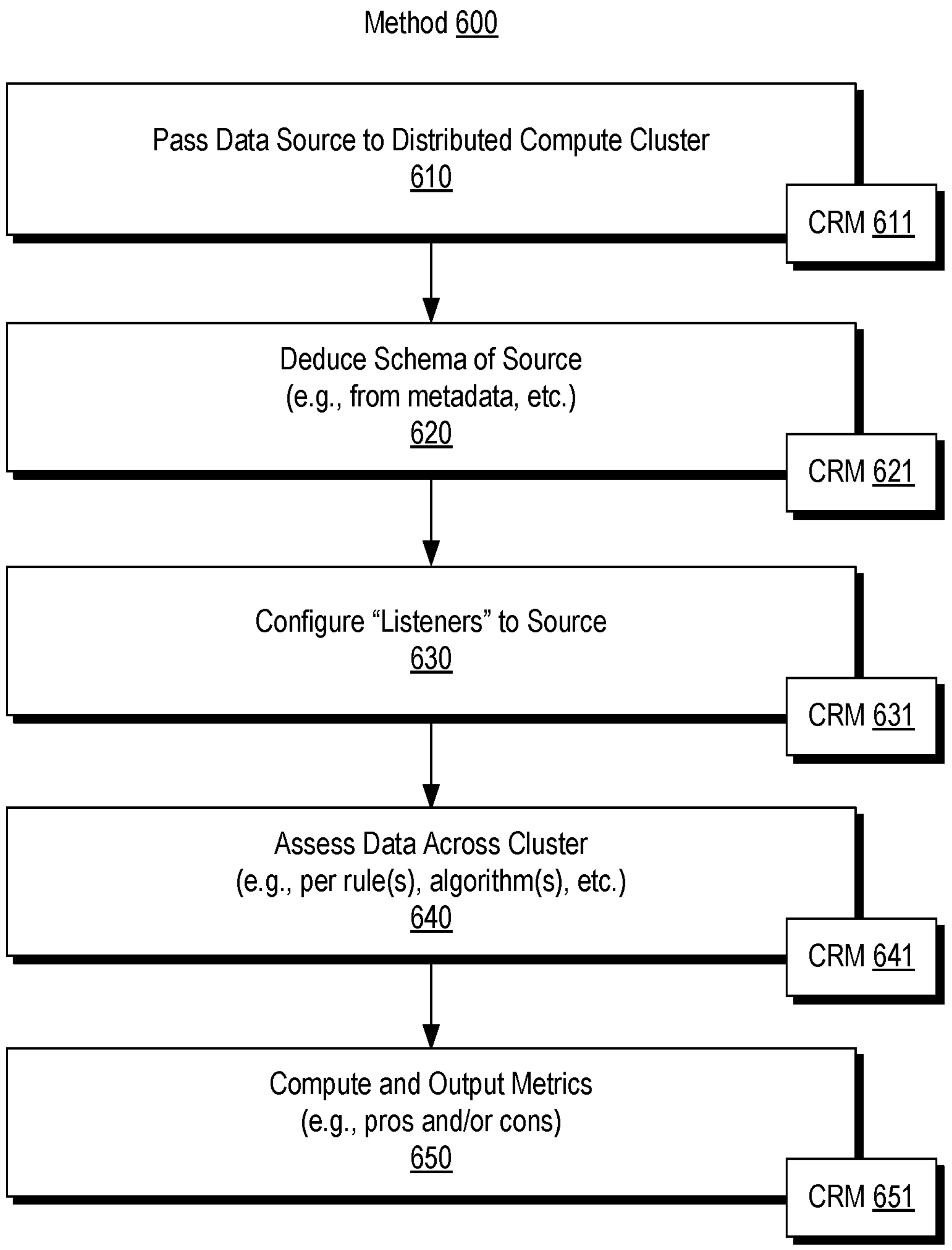
FIG. 6 illustrates an example of a method.

FIG. 6 shows an example of a method 600 that includes a pass block 610 for passing a data source to a distributed compute cluster, a deduction block 620 for deducing a schema of the data source (e.g., from metadata, etc.), a configure block 630 for configuring one or more listeners to the data source, an assess block 640 for assessing data across the compute cluster (e.g., per rule(s), algorithm(s), etc.), and a compute and output block 650 for computing and optionally outputting one or more data metrics (e.g., as to pros, cons, etc.).

In the example of FIG. 6, the method 600 is shown along with various computer-readable storage media (CRM) blocks 611, 621, 631, 641 and 651, which can include processor-executable instructions that can be executed to perform one or more actions. Such blocks may be provided as a number of storage media and/or as a single storage medium.

As explained, input data from a data source may be in one or more forms such as, for example, static files (CSV, JSON, etc.) and/or data streams, for example, where real-time system data may come in bursts. For example, consider a local buffer that can collect data such as sensor data, etc., where the collected data may be transmitted according to time, according to amount of data, according to an encryption technique, according to a compression technique, etc. As an example, local equipment may include one or more processors, controllers, etc., that can process raw data to provide processed data as output. For example, consider raw data that include data acquired over short intervals where the short intervals are averaged to provide an averaged value that is stored to memory and/or transmitted. As an example, as mentioned, measurement of code types of data may be generated locally and then streamed. In such an example, measurements of different pieces of code may be packaged in a message such that the measurements can be compared or otherwise assessed (e.g., as a group, a set, etc.). As an example, certain types of data may be accompanied by a hash or hashes. For example, consider a data packet that includes pieces of data and a hash of the pieces of data. In such an example, the hash may be regenerated at a reception end and compared to the transmitted hash for purposes of data assessment. Such an approach may be in addition to one or more other types of assessed data metrics.

As an example, a method can include setting up a distributed cluster and passing a data source handle to it, where once having a handle to the input source, the cluster can deduce metadata and configure listeners to that input source/stream. As an example, a schema may be steady and not change or, for example, where a piece of equipment is substituted, etc., a schema may change, which may be detected automatically via a feedback type of mechanism that may be related to one or more data metrics generated by a data assessment engine. For example, if data quality suddenly changed, an alert may be issued to check for a change in schema. In such an example, consider a csv type of equipment file/stream being replaced with a JSON type of equipment file/stream (e.g., due to a software upgrade, equipment replacement, etc.). As an example, various components of a cluster can receive data from one or more listeners and then process input data (e.g., static and/or stream) in a manner that may implement one or more rules, one or more algorithm, etc., where such rule(s) and/or algorithm(s) may operate as one or more filters. In such an example, one or more defects and/or one or more opportunities may be computed that can be passed on to a score engine (e.g., consider a data quality score engine, etc.).

As an example, a listener may be a data server type of listener that can provide for listening on a socket (e.g., TCP, etc.) and/or other type of port, etc. As an example, a structured streaming approach may be implemented using a framework such as, for example, the APACHE SPARK framework, which can provide a scalable and fault-tolerant stream processing engine (e.g., utilizing a SQL engine, etc.). As an example, an engine provide for incremental and/or continuous running and updating of a result or results as streaming data continues to arrive. In the APACHE SPARK framework, various data structures and/or components may be utilized, for example, to express streaming aggregations, event-time windows, stream-to-batch joins, etc.

As an example, streaming queries may be processed using a micro-batch processing engine, which processes data streams as a series of small batch jobs (e.g., mini-batch, micro-batch, etc.) thereby achieving end-to-end latencies as low as 100 milliseconds and fault-tolerance guarantees. Another mode in APACHE SPARK is referred to as continuous processing, which is a low-latency processing mode that may achieve end-to-end latencies as low as 1 millisecond. As an example, a framework may be configured, optionally automatically, to utilize one or more modes that the framework may provide. As to a listener, in the APACHE SPARK framework, consider, as an example, "spark.streams.addListener(new StreamingQueryListener( )", which is a contract of listeners that can be notified about one or more types of life cycle events of streaming processes (e.g., start, progress, termination, etc.); noting that other types of listeners may be available for one or more purposes (internal operation, reception of data, output of data, etc.).

As an example, a listener may be an interface that may be part of a system, a framework, a network component, etc., that can provide for one or more types of detections and/or inputs, for example, as to ingestion of data, progression of assessment of data, etc. As an example, a listener, or interface, may be configured for ingestion of data from one or more sources where the configuration can pertain to data schema (e.g., singular or plural). As an example, a data source may output data in a certain format, according to a certain communication protocol (e.g., hardware layer, software layer, etc.). As an example, a system can provide for appropriate reception of data from one or more data sources such that the data can be assessed, for example, using an assessment engine.

As an example, a data score computation engine can be a type of assessment engine that can provide for input of small batch data of defects and/or opportunities and provide for output of one or more aggregated data metrics. For example, as to data metrics, consider one or more of completeness, validation, flat liner, outlier, inlier, ratios, etc.

Figure 7:
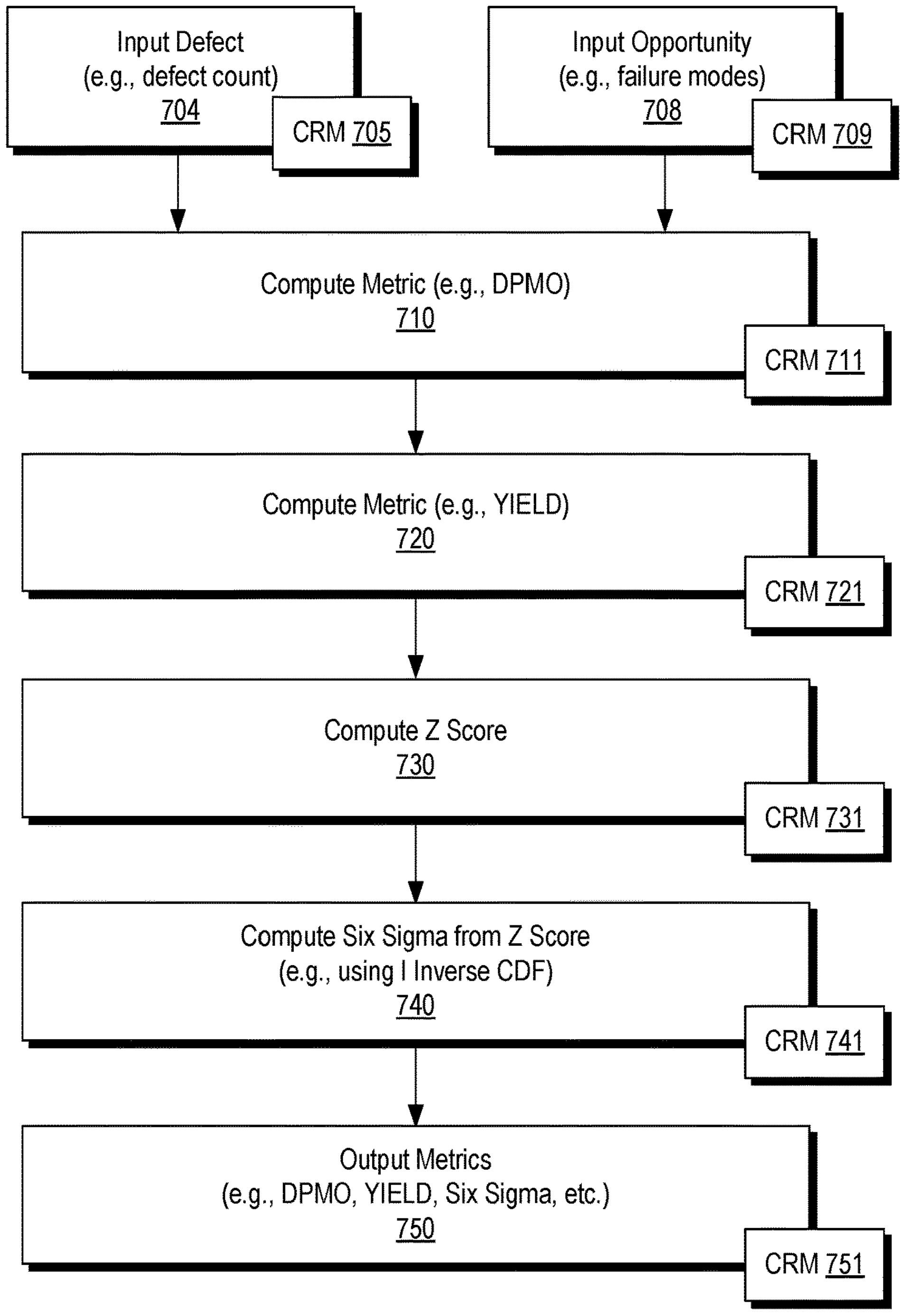
FIG. 7 illustrates an example of a method.

FIG. 7 shows an example of a method 700 that includes input blocks 704 and 708 for inputting defect (e.g., defect count(s), etc.) and inputting opportunity (e.g., failure mode (s), etc.) to a compute block 710 for computing one or more metrics (e.g., defects per million opportunities (DPMO), etc.). As shown, a compute block 720 can provide for computing one or more other metrics (e.g., YIELD) and a compute block 730 can provide for computing one or more other metrics (e.g., Z Score). As shown, a compute block 740 can provide for computing one or more six sigma metrics from a Z score, for example, using an I inverse CDF). As shown, the method 700 can include an output block 750 for outputting one or more metrics (e.g., DPMO, YIELD, Six Sigma, Z Score, etc.).

As an example, a metric can be one or more of Defects Per Unit (DPU), Defects per Million Opportunities (DPMO), Parts per Million Defective (PPM), Rolled Throughput Yield (RTY), etc.

A defect can refer to a flaw or discrepancy in an operation or on an item where more than one flaw (defect) may possibly be found. For example, a car can be one finished unit in a process and a car may include different areas that are assembled to create a finished vehicle. In such an example, one or more of the areas could have a defect or defects. As to defective, this can refer to a decision made that an item is unacceptable, for example, based on an accumulation of multiple defects. As an example, a method can provide for considering opportunity versus units. In such an example, a unit may be a final product that may include one or more defects, or not, and that may be found to be defective. Opportunities can represent various aspects of "making" a unit where each opportunity may have the potential of having a defect or defects.

In the context of data, defects may be as to data itself and/or as to values or other meaning of the data. For example, a value may be an outlier value that is a type of defect and missing data in a stream may be another type of defect. Opportunities can be associated with one or more aspects of data generation, data access, data schema, data transmission, etc.

As an example, a Z Score computation may be used to derive a z statistic from a raw score and known or estimated distribution mean and standard deviation. If variance is known, then a standard deviation can be computed by a square root. As an example, output may include probabilities calculated for different areas under a standard normal curve, which may, for example, correspond to a one-tailed or two-tailed test of significance. As an example, cumulative probabilities may be computed using a standard normal cumulative distribution function (CDF). As an example, a z statistic computation may be used in an inverse manner, for example, to obtain a Z critical value corresponding to a given probability. A Z distribution can be a standard normal distribution of a random variable Z meaning such that it is a normal distribution with a mean of 0 and a variance and a standard deviation equal to 1.

As mentioned, a Z Score may be computed and, for example, referred to as standard score where a Z value is a signed real valued dimensionless quantity which indicates the number of standard deviations by which a given observed data point is distanced from the mean or expected value of a distribution. In such a context, “standard” can refer to the fact that computation is against the standard normal distribution (“Z distribution”), which, as mentioned, can be defined by its mean and standard deviation of zero and one, respectively.

A Z value may be utilized for one or more purposes, for example, in statistical inference and/or estimation. For example, consider use in a Z-test of significance as well as confidence interval calculations. Z values may be used in process control and quality assurance applications (e.g., six sigma). Due to Z values being standardized scores they can be useful in comparing measurements across different scales.

As an example, a method can include implementing a data score computation engine (e.g., data quality, etc.), which may output one or more metrics for use in a customizable hierarchical presentation layer. For example, consider metrics computed from a data quality score engine and metadata from input streams that can be passed on to a presentation layer, where one or more users can analyze and gain insights about current data quality situation(s), where, for example, in real-time scenario(s), such view(s) can be updated as batches of data are processed.

Figure 8:
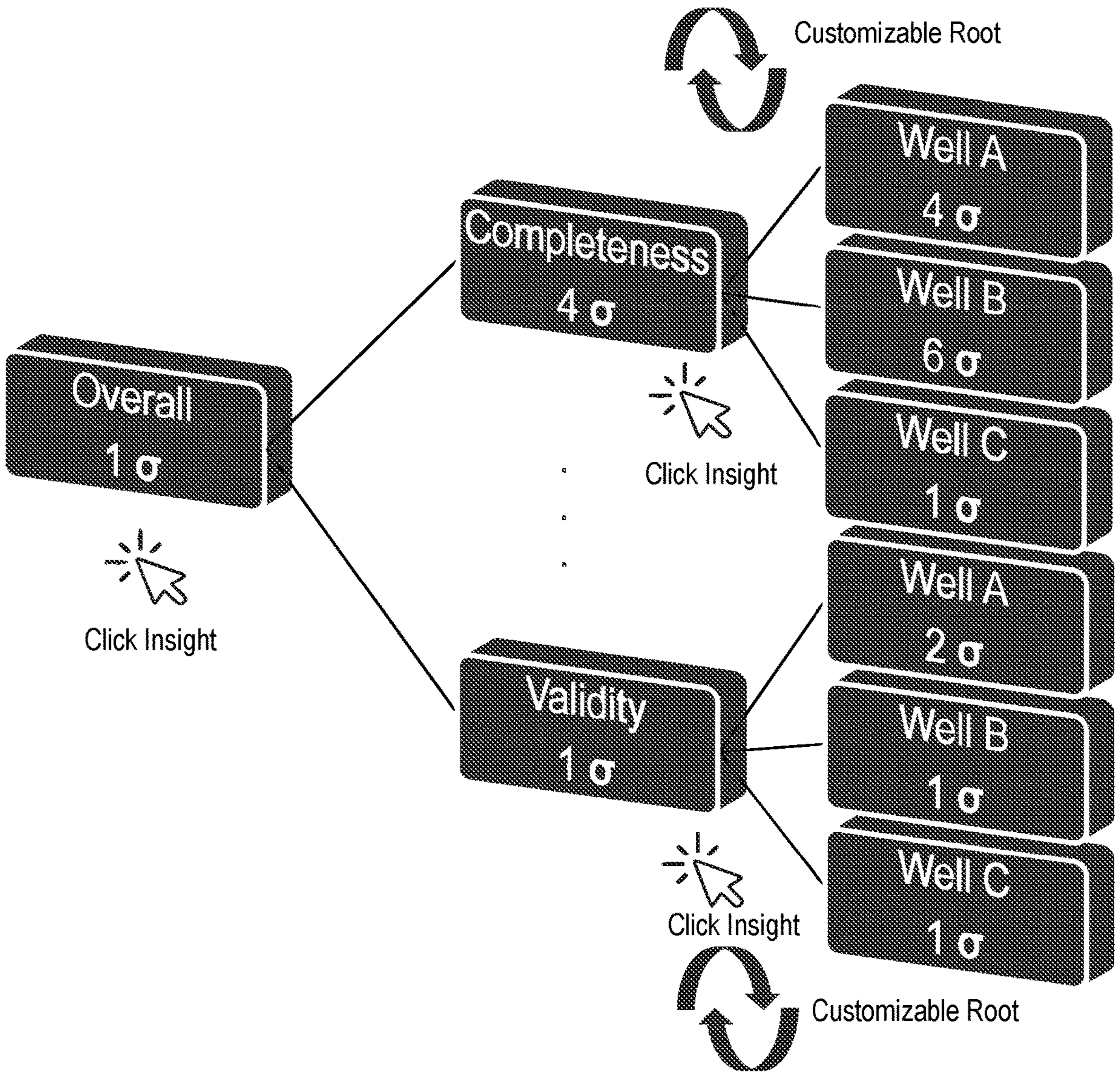
FIG. 8 illustrates an example of a graphical user interface.

FIG. 8 shows an example of a graphical user interface (GUI) 800 that illustrates one of a variety of arrangements of a hierarchical view that can be rendered for one or more end users. For example, consider a user changing the root at an intermediate layer and swapping it with one or more below layers to navigate through different data quality dimensions. In such an example, each intermediate layer may utilize a graphical control that provides for one click actionable insight associated with it.

In the example of FIG. 8, each node in the hierarchical visualization 800 may be associated with a one click insight graphical control. For example, when user clicks on “completeness” node, the user can see a summary of attributes for a number of wells. In such an example, users can arrive quickly at a conclusion as to which well or wells is/are doing better with regards to a completeness data quality metric as compared to others.

FIG. 9 shows an example of a graphical user interface (GUI) 900, a network 901, a portion thereof 910, which can also be considered to be a network (e.g., network 910). As shown, a network can include a plurality of wells, for example, the network 910 includes a well 11, a well 12, a well 21 and a well 22. As shown, a network can include manifolds such as the manifolds labeled Man1, Man2, and Man3 in the network 910. Various conduits can be utilized for transport of fluid in a network, for example, from one or more wells to one or more processing facilities, optionally via one or more chokes, manifolds, pumps, etc. FIG. 9 shows that a network can be quite complex and include tens of wells or more.

As shown in FIG. 9, the graphical user interface (GUI) 900 can include a number of data types versus a number of different wells where data are characterized graphically utilizing, for example, colors, hatchings, etc. In the example of FIG. 9, the GUI 900 shows percent missing data as a metric where graphical indicators may provide for quintiles (e.g., 0, 20, 40, 60 and 80 percent, etc.). The GUI 900 may be considered to be a type of heat map that can provide a user with a quick overview of data type with respect to missing data (e.g., completeness) for a field of wells. Such a GUI may provide insight quickly for locating one or more data quality issues in various measured attributes across wells. As an example, the GUI 900 may include one or more network graphics, for example, with one or more wells, pieces of equipment, etc., where graphics may be interactive. As an example, a heat map may be generated for rendering on a network of wells, equipment, etc.

As to equipment, consider a choke that can be a device incorporating an orifice that is used to control fluid flow rate or downstream system pressure. Chokes may be available in various configurations, for example, for one or more of fixed and adjustable modes of operation. As an example, an adjustable choke may enable fluid flow and pressure parameters to be changed to suit process or production requirements, optionally via a controller that is operatively coupled to an actuator that can adjust one or more pieces of the choke. As to a fixed choke, it may be more resistant to erosion under prolonged operation or production of abrasive fluids than various adjustable chokes. As an example, a well may be fitted with a choke that can be selected and/or controlled to suit desired operational parameters (e.g., flow rate, production, etc.).

As an example, one or more artificial lift processes may be utilized in one or more field operations. Artificial lift can include, for example, a surface pump (e.g., a sucker rod pump), a downhole pump (e.g., an electric submersible pump), gas lift, etc. As an example, a network such as the network 901 of FIG. 9 can include one or more pieces of artificial lift equipment.

As to gas lift, it is a process where, for example, gas may be injected from an annulus into tubing. An annulus, as applied to an oil well or other well for recovering a subsurface resource may refer to a space, lumen, or void between piping, tubing or casing and the piping, tubing, or casing immediately surrounding it, for example, at a greater radius.

As an example, injected gas may aerate well fluid in production tubing in a manner that “lightens” the well fluid such that the fluid can flow more readily to a surface location. As an example, one or more gas lift valves may be configured to control flow of gas during an intermittent flow or a continuous flow gas lift operation. As an example, a gas lift valve may operate based at least in part on a differential pressure control that can actuate a valve mechanism of the gas lift valve.

As an example, a system may operate to model and simulate reserves of oil and/or one or more other fluids (e.g., water, gas, etc.). For example, consider utilization of computational reservoir characterization tools that provide for stratigraphic and structural reservoir understanding, which can involve conversion of 2D maps to 3D models. Such tools may provide for reservoir characterizations during one or more phases of an exploration, development, and production lifecycle.

As explained, a method can provide a tool for oil and gas and/or one or more other industries that can, for example, compute six sigma data quality metrics in real-time using a distributed data processing framework where one or more components may provide for visualization of a quality score in a hierarchical display/dashboard.

As an example, a system can provide for real-time data quality metrics computation and monitoring using six sigma principles. Such an approach can include real-time processing of data bursts. As an example, a system can provide for hierarchical visualization with actionable insights at individual depths of the hierarchy.

As an example, a system can provide for real-time data quality metric computation using a distributed system with real-time updates (e.g., a live, online system, etc.). As explained, a system can provide for hierarchical visualization coupled with actionable insights.

As an example, a system may provide for real-time response of out of the box and optionally include customized rules, algorithms, etc. Such a system can provide for distributed data processing, real-time data quality score updates, etc.

As explained, a system may provide for real-time computation/updates of data quality metrics using a distributed system that can be part of a customizable solution as per use demand(s), where a user may also visualize such metrics in a hierarchical form with actionable insights at each level in a hierarchy.

As an example, a system may be implemented in a system such as the system 100 of FIG. 1. For example, consider the GUI 120 and the various data access 125 and visualization 123 features. As an example, a system may be accessible as a computational framework that can be distributed (e.g., cloud-based, etc.) and present in a GUI such as the GUI 120 (see, e.g., "other" 124). As an example, the GUI 120 may provide for access to one or more other GUIs that may provide for customization, linking, listening, control action, etc. As an example, the visualization 123 component of the GUI 120 may utilize a framework such as the OpenGL framework, etc. As an example, the APACHE SPARK framework may be operatively coupled with the OpenGL framework and/or one or more other visualization frameworks setting-up, viewing, customizing, navigating, etc., a system, an assessment workflow, an assessment engine, etc. As an example, a hierarchy may be customizable and/or navigable utilizing, at least in part, one or more features of a visualization framework.

As an example, a system, a method, etc., may utilize one or more machine learning features, which can be implemented using one or more machine learning models. As to types of machine learning models, consider one or more of a support vector machine (SVM) model, a k-nearest neighbors (KNN) model, an ensemble classifier model, a neural network (NN) model, etc. As an example, a machine learning model can be a deep learning model (e.g., deep Boltzmann machine, deep belief network, convolutional neural network, stacked auto-encoder, etc.), an ensemble model (e.g., random forest, gradient boosting machine, bootstrapped aggregation, AdaBoost, stacked generalization, gradient boosted regression tree, etc.), a neural network model (e.g., radial basis function network, perceptron, back-propagation, Hopfield network, etc.), a regularization model (e.g., ridge regression, least absolute shrinkage and selection operator, elastic net, least angle regression), a rule system model (e.g., cubist, one rule, zero rule, repeated incremental pruning to produce error reduction), a regression model (e.g., linear regression, ordinary least squares regression, stepwise regression, multivariate adaptive regression splines, locally estimated scatterplot smoothing, logistic regression, etc.), a Bayesian model (e.g., naïve Bayes, average on-dependence estimators, Bayesian belief network, Gaussian naïve Bayes, multinomial naïve Bayes, Bayesian network), a decision tree model (e.g., classification and regression tree, iterative dichotomiser 3, C4.5, C5.0, chi-squared automatic interaction detection, decision stump, conditional decision tree, M5), a dimensionality reduction model (e.g., principal component analysis, partial least squares regression, Sammon mapping, multidimensional scaling, projection pursuit, principal component regression, partial least squares discriminant analysis, mixture discriminant analysis, quadratic discriminant analysis, regularized discriminant analysis, flexible discriminant analysis, linear discriminant analysis, etc.), an instance model (e.g., k-nearest neighbor, learning vector quantization, self-organizing map, locally weighted learning, etc.), a clustering model (e.g., k-means, k-medians, expectation maximization, hierarchical clustering, etc.), etc.

As an example, a machine model may be built using a computational framework with a library, a toolbox, etc., such as, for example, those of the MATLAB framework (MathWorks, Inc., Natick, Massachusetts). The MATLAB framework includes a toolbox that provides supervised and unsupervised machine learning algorithms, including support vector machines (SVMs), boosted and bagged decision trees, k-nearest neighbor (KNN), k-means, k-medoids, hierarchical clustering, Gaussian mixture models, and hidden Markov models. Another MATLAB framework toolbox is the Deep Learning Toolbox (DLT), which provides a framework for designing and implementing deep neural networks with algorithms, pretrained models, and apps. The DLT provides convolutional neural networks (ConvNets, CNNs) and long short-term memory (LSTM) networks to perform classification and regression on image, time-series, and text data. The DLT includes features to build network architectures such as generative adversarial networks (GANs) and Siamese networks using custom training loops, shared weights, and automatic differentiation. The DLT provides for model exchange various other frameworks.

As an example, the TENSORFLOW framework (Google LLC, Mountain View, CA) may be implemented, which is an open source software library for dataflow programming that includes a symbolic math library, which can be implemented for machine learning applications that can include neural networks. As an example, the CAFFE framework may be implemented, which is a DL framework developed by Berkeley AI Research (BAIR) (University of California, Berkeley, California). As another example, consider the SCIKIT platform (e.g., scikit-learn), which utilizes the PYTHON programming language. As an example, a framework such as the APOLLO AI framework may be utilized (APOLLO.AI GmbH, Germany). As an example, a framework such as the PYTORCH framework may be utilized (Facebook AI Research Lab (FAIR), Facebook, Inc., Menlo Park, California).

As an example, a training method can include various actions that can operate on a dataset to train a ML model. As an example, a dataset can be split into training data and test data where test data can provide for evaluation. A method can include cross-validation of parameters and best parameters, which can be provided for model training.

The TENSORFLOW framework can run on multiple CPUs and GPUs (with optional CUDA (NVIDIA Corp., Santa Clara, California) and SYCL (The Khronos Group Inc., Beaverton, Oregon) extensions for general-purpose computing on graphics processing units (GPUs)). TENSORFLOW is available on 64-bit LINUX, MACOS (Apple Inc., Cupertino, California), WINDOWS (Microsoft Corp., Redmond, Washington), and mobile computing platforms including ANDROID (Google LLC, Mountain View, California) and IOS (Apple Inc.) operating system based platforms.

TENSORFLOW computations can be expressed as stateful dataflow graphs; noting that the name TENSORFLOW derives from the operations that such neural networks perform on multidimensional data arrays. Such arrays can be referred to as "tensors".

As an example, a device and/or distributed devices may utilize TENSORFLOW LITE (TFL) or another type of lightweight framework. TFL is a set of tools that enables on-device machine learning where models may run on mobile, embedded, and IoT devices. TFL is optimized for on-device machine learning, by addressing latency (no round-trip to a server), privacy (no personal data leaves the device), connectivity (Internet connectivity is demanded), size (reduced model and binary size) and power consumption (e.g., efficient inference and a lack of network connections). Multiple platform support, covering ANDROID and iOS devices, embedded LINUX, and microcontrollers. Diverse language support, which includes JAVA, SWIFT, Objective-C, C++, and PYTHON. High performance, with hardware acceleration and model optimization. Machine learning tasks may include, for example, data processing, image classification, object detection, pose estimation, question answering, text classification, etc., on multiple platforms.

As an example, a system may utilize one or more frameworks. For example, consider utilization of the APACHE SPARK framework and a ML framework. In such an example, data may be characterized, processed, assessed, etc., in a manner that can facilitate machine learning (e.g., generation of one or more ML models, etc.). As explained, assessments as to data quality may be performed where a level of data quality may be selected for identifying suitable training data. Such an approach may make a ML model more robust, more accurate, etc. As an example, a ML model may be part of a system, for example, part of a system component. As an example, source data may include data from a source that can implement a ML framework. For example, consider an IoT wellsite or production network system where various devices can include a ML framework suitable for execution of a ML model that can generate output where the output can be data of a source. In such an example, a method may include detecting a schema of the data where the schema can provide for identification of ML model generated output, which may be a type of data whereby quality thereof may be assessed (e.g., completeness, validity, consistency, etc.). As an example, a lack of consistency in output of a ML model may indicate that the ML model is not operating properly and/or where re-training may be appropriate, etc.

As an example, an approach may include hyperparameter tuning using one or more features of a data assessment system, for example, to generate a best set of hyperparameters for ML model training (e.g., to reduce training time, error rate, etc.). As an example, a system may include features for ML model deployment where such ML models may be trained using data that have been assessed (e.g., to a level of quality, etc.). In such an example, deployment may be to one or more sources where such sources can be suppliers of data and processors of data (e.g., consider local processing using one or more local ML model frameworks). In such an example, a system may provide for data enhancements locally and in the cloud. In such an approach, cloud based features (e.g., distributed computing) can assess data, which may include ML model generated data, and provide data quality assessment that can provide for understanding of a field system and/or provide for updating one or more ML models in the field system. As an example, a system may employ levels of ML models, for example, consider employment at a field data assessment level and at a more localized level (e.g., per well, per piece of equipment, etc.).

As an example, a system, a method, etc., may utilize one or more types of data structures that may be associated with one or more computational frameworks. For example, consider one or more of a Resilient Distributed Dataset (RDD), a dataframe (DF) or a dataset (DS).

RDDs can be generated as a collection of objects capable of storing data partitioned across multiple nodes of computing cluster where processing may be in parallel. RDDs can be fault-tolerant, for example, when performing multiple transformations on a RDD if a node fails, the RDD can be capable of recovering automatically.

RDDs can be generated, for example, by parallelizing an existing collection of data, referencing to an external data file as stored, creating a RDD from an already existing a RDD. For example, consider one or more of my_list_rdd=sc.parallelize(my_list), file_rdd=sc.textFile ("path_of_file"), rdd_23.py hosted by X, etc.

As an example, a system can include features that can provide for one or more of automatically inferring a schema of ingested data (e.g., via learning using data, metadata, etc., via communication protocol, via type of data as may be particular to a type of equipment, etc.), receiving a specification as to a schema ingested data, etc. As an example, a scheme may be inferred using one or more machine learning models (e.g., consider a ML model pipeline, etc.).

As to DFs, they can be a distributed collection of data points where data are organized into named columns. DFs may help in debugging code during a runtime (e.g., a feature that may be unavailable for RDDs). As an example, DFs may read and write data into one or more of various formats (e.g., consider one or more of CSV, JSON, AVRO, HDFS, HIVE, etc.). As an example, a DF approach may utilize a catalyst optimizer for optimization purposes (e.g., utilizing SQL features, tools, etc.).

As to DSs, they can be an extension of an application programming interface (API). DSs may include features of RDDs and/or DSs. A DS approach can provide a type-safe interface where type safety provides for operation of a compiler in a manner that can validate data types in a DS (e.g., columns, etc.) during compilation to throw an error if a mismatch exists in data types. DSs may be utilized for efficient processing of structured data and/or unstructured data.

As an example, a system, a method, etc., may utilize a framework such as the APACHE SPARK framework, which is a cluster computing framework that supports use of RDDs, DFs and DSs, including a DS API.

In the SPARK framework, a DS can be a distributed collection of data where a DS interface can be provided for utilization and implementation of such data structures (e.g., components, etc.). A DS approach can provide strong typing, ability to use lambda functions, an ability to use a SQL optimized execution engine, etc. A DS may be constructed from JAVA Virtual Machine (JVM) objects and, for example, manipulated using functional transformations (e.g., map, flatMap, filter, etc.). The DS API may be accessed via programming in one or more languages (e.g., consider SCALA, JAVA, etc.). As an example, in the PYTHON language, program code may provide for accessing a field of a row by name naturally row.columnName, etc.

As explained, a DF can be data organized into named columns such that it may be conceptually equivalent to a table in a relational database or a data frame in PYTHON. DFs can be constructed from a wide array of sources such as: structured data files, tables in HIVE, external databases, existing RDDs, etc. A DF API is available in the SPARK framework (e.g., SCALA, JAVA, PYTHON, R, etc. languages).

Figure 10:
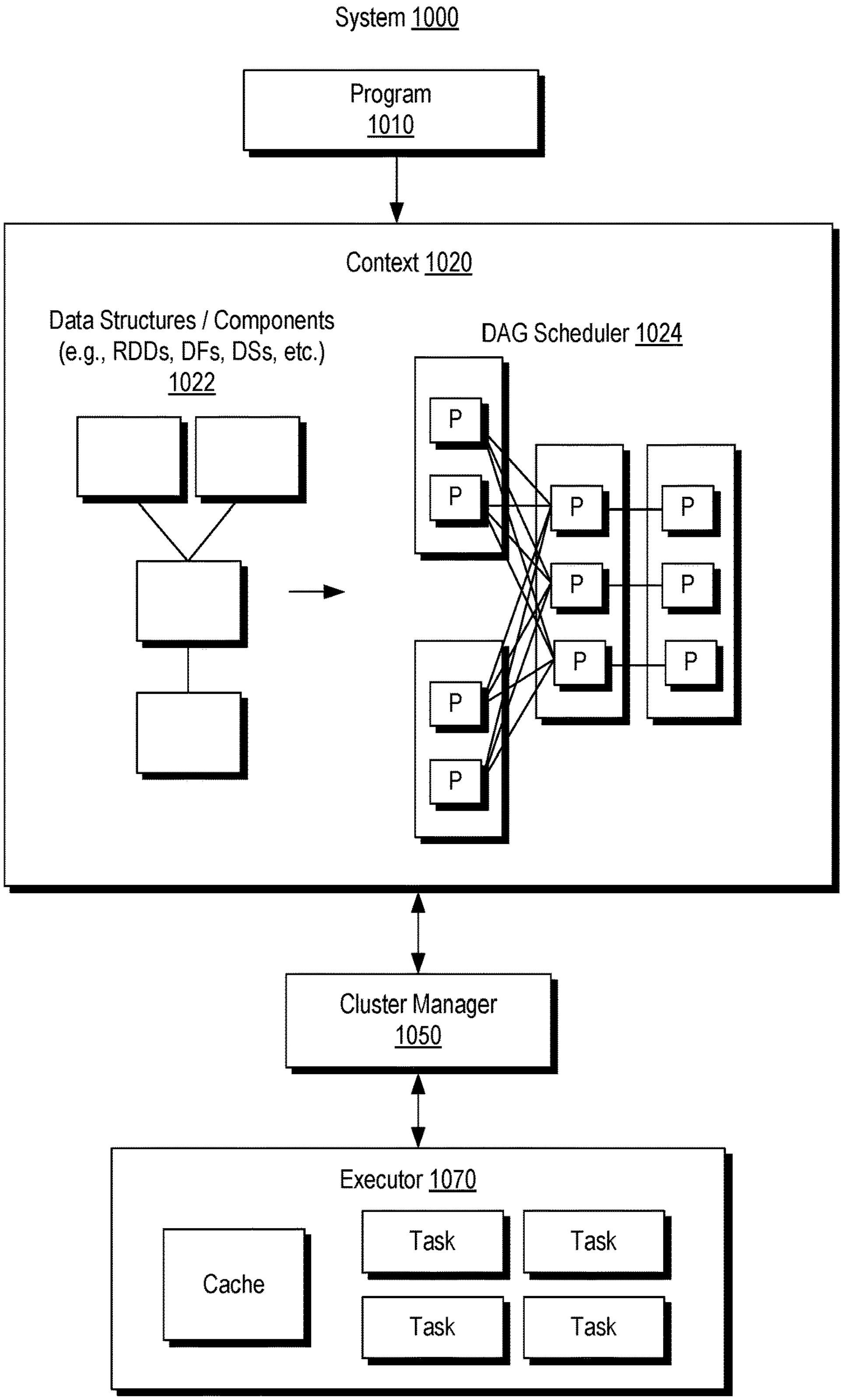
FIG. 10 illustrates an example of a system.

FIG. 10 shows an example of a system 1000 that includes an executable program block 1010, a context block 1120, a cluster manager block 1050 and an executor block 1070. As shown, the context block 1120 can include various data structures and/or components (DSCs) 1022 (e.g., consider one or more of RDDs, DFs, DSs, etc.) and a DAG scheduler 1024 where the DSCs 1022 can output a DAG to the DAG scheduler 1024.

As an example, the system 1000 can include one or more features of the APACHE SPARK framework. Such a framework can handle limitations of the MapReduce paradigm in handling iterative workloads and can be implemented for in-memory data analytics. The MapReduce paradigm forces mappers to write data to disk for reducers to read, which consumes significant I/O resources for iterative applications. The SPARK framework can keep data in memory, for example, as one or more of RDDs, DFs, DSs, etc., which can reduce I/O costs and speed up iterative job execution time by up to 10× compared to the HADOOP framework. As an example, one or more types of DSCs can be immutable collections distributed over a cluster of machines to form a restricted shared memory, where each DSC may include a set of partitions.

In the example of FIG. 10, a workflow can include providing a program per the program block 1010 that can be received (e.g., submitted) to a framework to provide a context per the context block 1020. Such an approach can utilize a driver that can execute one or more user applications and schedule them into executable jobs.

As an example, a programming model may be based on one or more types of functions, such as, for example, transformations and actions. Transformations can represent lazy computations on a DSC that can create a new DSC(s) (e.g., a map, a filter, etc.). Actions can trigger computation on a DSC and produce an output (e.g., count, collect, etc.). When an application invokes an action on a DSC, it triggers a job. Each job can have a DSC dependency graph that includes ancestor DSCs, representing a logical execution plan for the set of transformations. A DSC graph may be mapped into a Directed Acyclic Graph (DAG) defining a physical execution plan, for example, consider splitting of a job into stages, where dependencies between stages and the partitions are processed in each stage. A driver can use a DAG to define a set of tasks to execute at each stage. As an example, a DSC partition may be given as input to a stage and can be processed by a task. A driver can send tasks to a cluster manager, which can assign them, for example, to worker nodes. As an example, a worker node can include one or more executors, for example, each being a process executing an assigned task and sending the result back to the driver.

As to some examples of configuration parameters that can influence how operations work internally, consider one or more of number of executor instances, size of memory per executor, number of cores per executor, size of shuffled data buffer or the size of the off-heap memory, etc.

As an example, a DSC (e.g., a data structure and/or component) may be considered to be an immutable parallel data structure with failure recovery possibilities that can provide an API for various transformations and materializations of data as well as for control over caching and partitioning of elements to optimize data placement. A DSC may be created from external storage and/or from another DSC and can store information about its parents to optimize execution (e.g., via pipelining of operations) and recompute partition in case of failure.

As to an example RDD, it may represent distributed immutable data (e.g., partitioned data+iterator) and lazily evaluated operations (e.g., transformations, etc.). In such an example, as an interface, a RDD may define various properties such as, for example:

```
//a list of partitions (e.g. splits in HADOOP)
def getPartitions: Array[Partition]
//a list of dependencies on other RDDs
def getDependencies: Seq[Dependency[_]]
//a function for computing each split
def compute(split: Partition, context: TaskContext): Iterator[T]
//(optional) a list of preferred locations to compute each split on
def getPreferredLocations(split: Partition): Seq[String] = Nil
//(optional) a partitioner for key-value RDDs
val partitioner: Option[Partitioner] = None
```

Below, an example of RDDs created during a call of method sparkContext.textFile("hdfs:// . . . ") which first loads HDFS blocks in memory and then applies map ( ) function to filter out keys creating two RDDs:

```
HadoopRDD:
            getPartitions = HDFS blocks
          getDependencies = None
        compute = load block in memory
      getPrefferedLocations = HDFS block locations
      partitioner = None
MapPartitionsRDD
        getPartitions = same as parent
        getDependencies = parent RDD
    compute = compute parent and apply map( )
    getPrefferedLocations = same as parent
      partitioner = None
```

As to another type of DSC, consider, for example, a DF or a DS (e.g., a dataframe or a dataset as in a framework such as the SPARK framework). As explained, in a system such as a production system instrumented for data and/or control, consider the following example for "volve_dgm" (where "volve" or "Volve" is a production field group name) as may be implemented using the SPARK framework:

```
from pyspark.sql import SparkSession
from pyspark.sql.types import StructType
spark = SparkSession.builder.appName("volve_dqm").getOrCreate( )
# Read CSV files from set path
  rdf = spark.read.csv(path="D:\\production\\streaming\\daily.csv",
    sep=',',inferSchema=True,header=True)
rdf.printSchema( )
dfCSV = spark.readStream.option("sep", ";").option("header",
  "true").schema(rdf.schema).csv("D:\\production\\streaming\\")
#dfCSV = spark.readStream.option("sep", ";").option("header",
  "false").schema(userSchema).csv("/tmp/text")
```

Above, note that the example pertains to a streaming DF (DataFrame) which represents a running sum of a stream.

```
dfCSV.createOrReplaceTempView("volve")
samples = spark.sql("select sum(ON_STREAM_HRS) from volve group by
NPD_WELL_BORE_NAME")
# an example, not a query that calculates defects.
```

In the foregoing example, a system can start receiving data and computing the counts. For example, consider setting a framework up to print/render the complete set of counts (e.g., specified by outputMode("complete")) to a console each time they are updated. In such an example, a method can then start the streaming computation using start( ).

```
# Start running the query that prints the running counts to the console
query = samples\
  .writeStream\
  .outputMode('complete')\
  .format('console')\
    .option('path', 'D:\\production\\streaming\\')\
  .option("checkpointLocation", "D:\production\\streaming\\")\
  .start( )
#samples.writeStream.format("console"). start( ) # redirect to console, we can
use any other source.
query.awaitTermination( )
# similary pyspark.sql.DataFrame.approxQuantile may be used for outlier
(e.g., validity detection) where, for example, at 0.25 and 0.75 it can provide
quartiles).
```

FIG. 11 shows examples of graphical user interfaces (GUIs) 1110 and 1130 that can be transitional. For example, consider transitioning from top to bottom or bottom to top in one or more of the GUIs 1110 and 1130 or, for example, transitioning from the GUI 1110 to the GUI 1130 or vice versa. In the examples of FIG. 11, the GUIs 1110 may change responsive to receipt of instructions and/or responsive to receipt of live streaming data. As an example, a user may click on the overall graphic to break it out into a series of graphics, for example, as to completeness, validity and consistency. As shown, the overall graphic can have a sigma indicator where it may be based on the individual conditions of the break out graphics. In the example GUIs 1110, the Well A has a completeness of seven sigma, however, other wells are at one sigma; hence, the overall completeness is at one sigma. Such an approach can allow an operator to readily discern data issues and/or other issues on a well by well basis, a group basis, etc. In the example GUIs 1130, note that the overall graphic can be broken out differently than in the GUIs 1110. In particular, the overall graphic can be broken out into overall per well graphics such that an operator can determine overall data issues and/or other issues (e.g., as may be discerned in data assessments) for one or more individual wells.

FIG. 12 shows some examples of system components 1200, which include a flatliner component 1202, a gauge scatter component 1204, an unrealistic gauge values component 1206, an instrument out of range component 1208, a trend deviation component 1210, a no data coming in component 1212 and a manual entry component 1214. One or more of the system components 1200 may be actuated and utilized in one or more assessments, for example, by one or more assessment engines of a system or systems. As an example, one or more alerts, control signals, etc., may be generated responsive to operation of one or more of the system components 1200. For example, consider a reboot control signal where a data issue is indicated for a data stream where the reboot control signal may cause rebooting (e.g., refreshing, restarting, resetting, etc.) one or more pieces of equipment (e.g., network equipment, control equipment, one or more sensors, etc.).

As an example, a system may include a schema detector that may be triggered by one or more issues. For example, one or more of the system components 1200 may operate to indicate that a data schema has changed (e.g., due to an upgrade, a new piece of equipment, a replacement, etc.). As an example, a system may automatically detect a change in schema and inform one or more of the system components 1200 that a new schema exists where data may be assessed in a manner that accounts for such a change (e.g., deleting or ignoring certain data, merging and/or transforming one or more types of data, etc.).

As explained, one or more ML models may be utilized by a system where, for example, data quality may be selected for identifying suitable training data, etc. As an example, a ML model may be part of a system, for example, part of a system component such as one or more of the system components 1200 of FIG. 12. As an example, consider a ML model trained for flatliner detection, gauge scatter detection, unrealistic gauge values detection, out of range detection, trend deviation detection (e.g., trend detection, etc.), etc.

Figure 13:
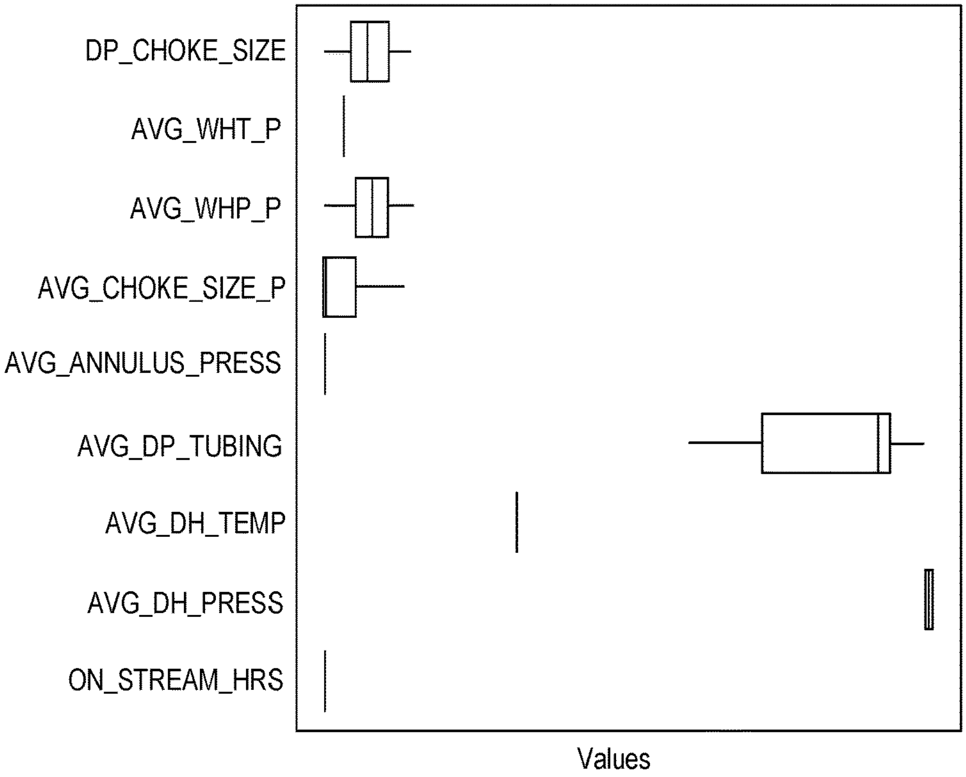
FIG. 13 illustrates an example of a graphical user interface.

FIG. 13 shows an example of a graphical user interface (GUI) 1300 that includes an overall assessment, an assessment for a well (Well X7) and a graphic for the well. The GUI 1300 demonstrates how a system can be utilized for a method of detecting a spike (e.g., one or more validity defects) in data from a production group with multiple wells. For example, consider the aforementioned Volve production group.

As an example, consider a framework such as the AVOCET production operations framework that may ingest various types of data, which can include relatively low frequency data. In such an example, assessments may be performed as to one or more of no missing data (e.g., not measured, not inputted in the database, etc.), no flat lines (e.g., consider flatliners as no change in last 2-3 data points, etc.), accuracy of plus and/or minus a percentage of a threshold value, sufficient data integrity (e.g., missing data, wrong data, typos, etc.). As an example, a system can provide for an operator or operators viewing raw data and/or modeled data, which may facilitate deciding which data to use when running one or more workflows (e.g., production control, production optimization, production equipment decision making, etc.).

As an example, a system may provide for domain rules that can be tailored to a particular basin and/or a particular group within a basin. For example, consider a system that can provide for automatic and/or manual customization as to a basin, a group, etc. As an example, a system may provide for identification of service opportunities, which may be part of an extensible service model. For example, data assessments may point to benefits of a particular additional service, which may include providing its own source or sources of data. In such an example, consider one or more data issues that may infer another type of data may be helpful when performing a workflow (e.g., a production workflow, a stimulation workflow, a simulation workflow, etc.). In such an example, consider pressure and temperature data as being insufficient such that a rheological service is recommended for deployment to provide rheological data (e.g., viscosity, etc.). As explained, a system may provide output that can be relevant to decisions, workflows, etc.

As mentioned, a system may aim to provide insight into data integrity. Such a system may provide an ability to perform dynamic query typing (e.g., on the fly integrity assessment rules along with pre-defined domain rules, etc.). For example, consider a SQL approach that can search for defects as to wells from a group of wells (e.g., a battery of wells).

Figure 14:
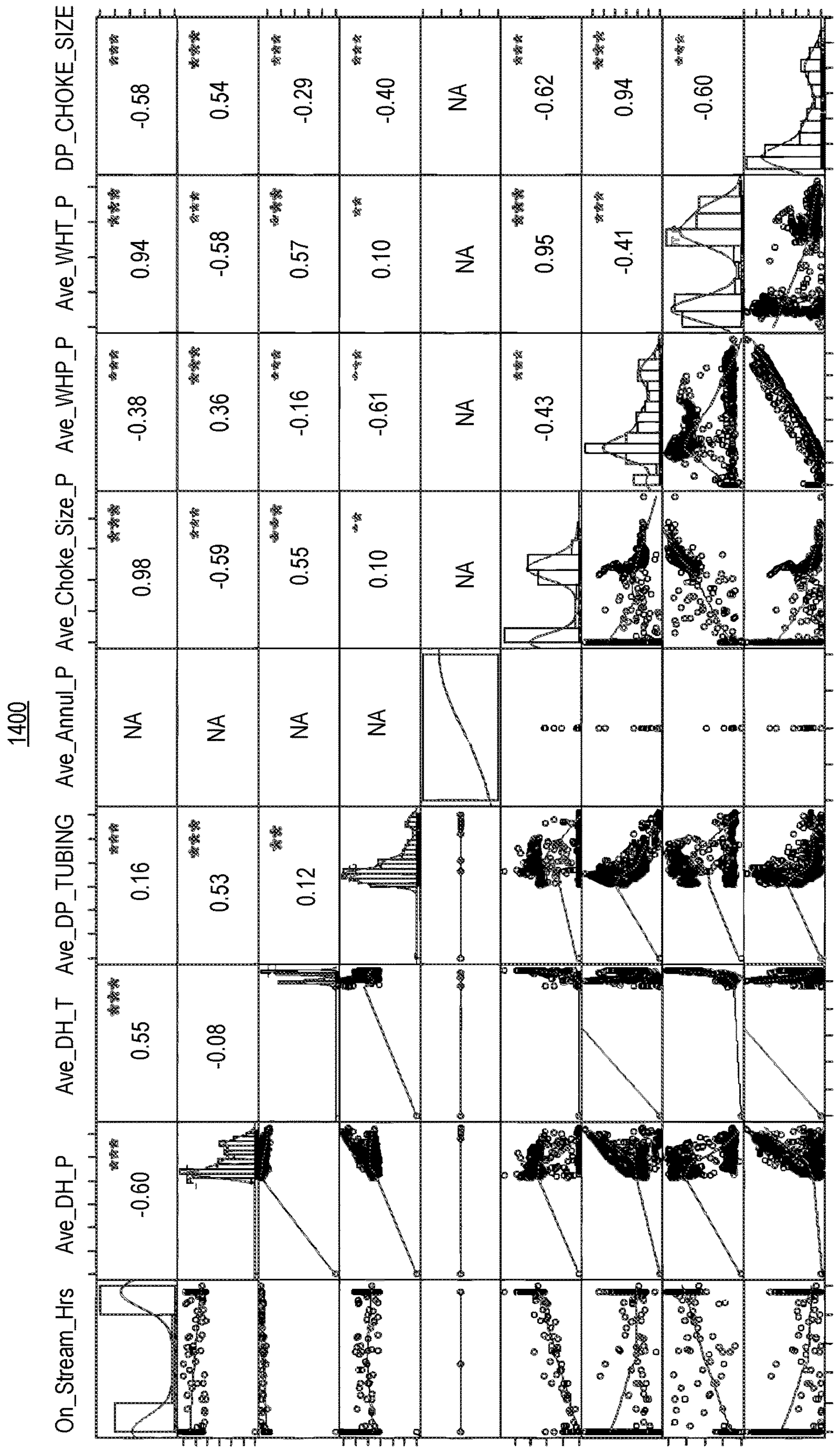
FIG. 14 illustrates an example of a graphical user interface.

FIG. 14 shows an example of a graphical user interface (GUI) 1400 that can be utilized for assessing data from multiple sources. For example, the GUI 1400 may be utilized to assess interactions between variables. In the GUI 1400, variables may be defined along two axes where correlations and/or plots may be rendered for numeric and/or graphical assessments. In the GUI 1400, some examples of variables are listed across the top that would also be listed at the left or right. In such an approach, an operator can determine if a correlation corresponds to an expected correlation. For example, Ave_WHT_P and DP_CHOKE_SIZE (see, e.g., 0.94) and/or Ave_CHOKE_SIZE and Ave_WHP_P (see, e.g., 0.95) may be expected to correlate. An operator may view such correlation assessments numerically and/or graphically in the GUI 1400. Where appropriate, one or more actions may be taken to address the lack of correlation (e.g., according to a threshold, etc.).

Figure 15:
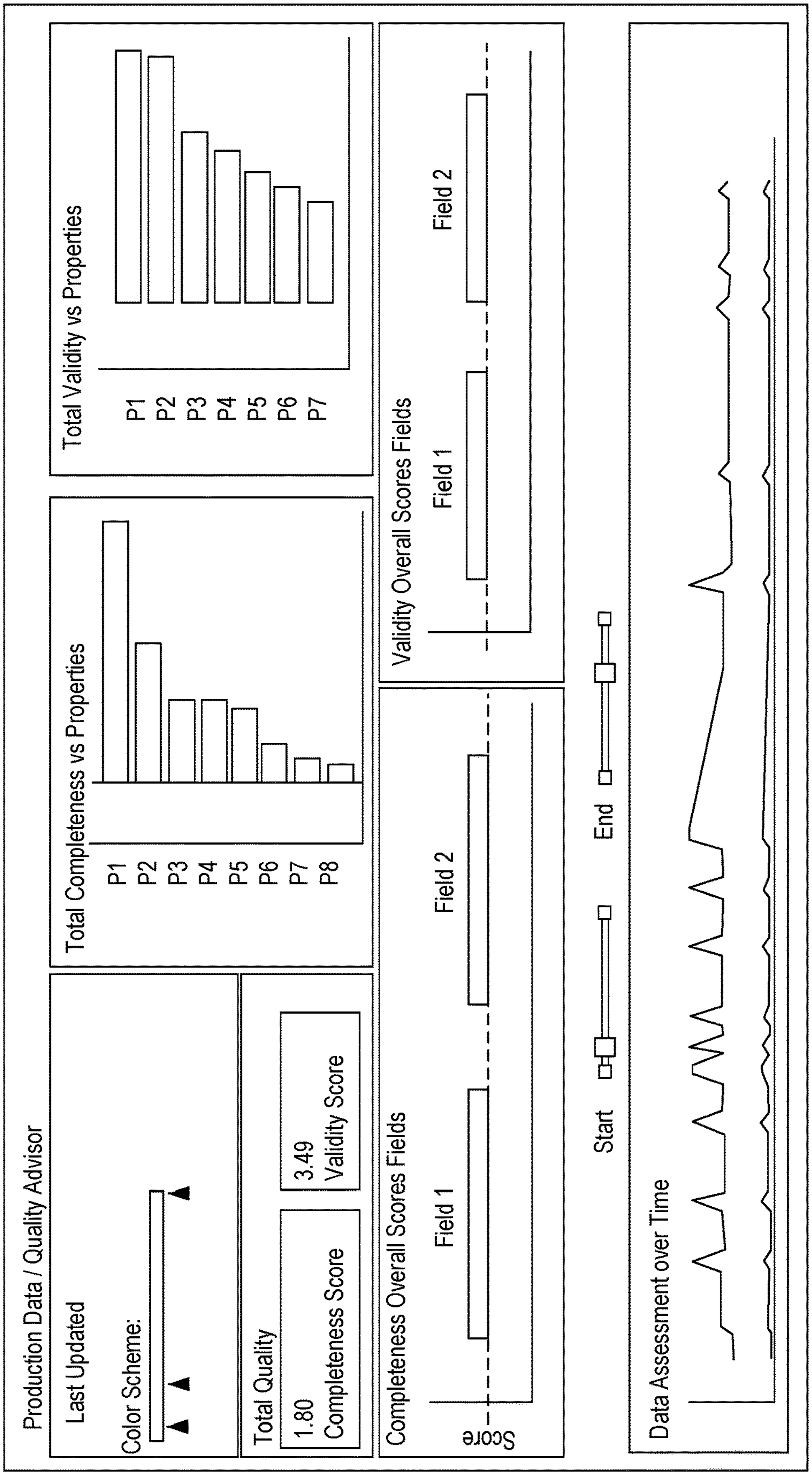
FIG. 15 illustrates an example of a graphical user interface.

FIG. 15 shows an example of a graphical user interface (GUI) 1500 that includes various graphics as to data assessments for field equipment data from multiple data sources. As shown, various fields can be assessed and various properties can be assessed (e.g., P1 to P7, etc.). In such an approach an operator may set a range for data assessment with respect to time, optionally with a play, rewind, forward feature such that the operator can glean insights that may occur with respect to time (e.g., trends, etc.).

Figure 16:
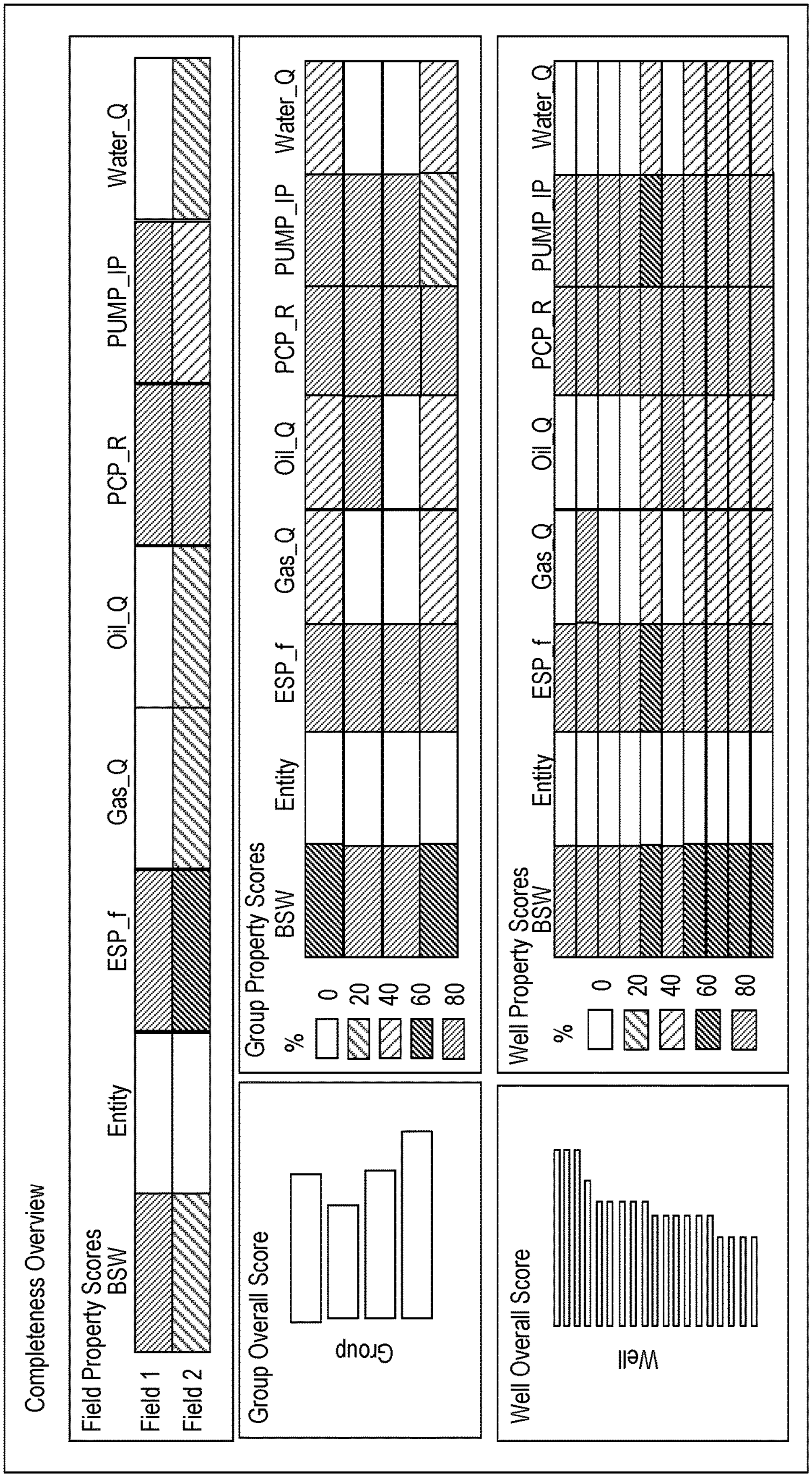
FIG. 16 illustrates an example of a graphical user interface.

FIG. 16 shows an example of a graphical user interface (GUI) 1600 that includes various graphics as to data assessments for field equipment data from multiple data sources. As shown, the GUI 1600 can include graphics that can indicate assess results for various properties, which may be grouped, well-by-well, etc. In the example of FIG. 16, the GUI 1600 shows a completeness overview for completeness assessments. The properties can include fluid production rates, operational frequency of an electric submersible pump (ESP), etc. In such an example, the ESP may include a gauge with various sensors that can sense downhole conditions such as temperature, pressure, flow rate, etc. As an example, an ESP may be part of an artificial life production enhancement strategy. The GUI 1600 may be utilized to assess such a strategy for enhancement of production at one or more wells.

Figure 17:
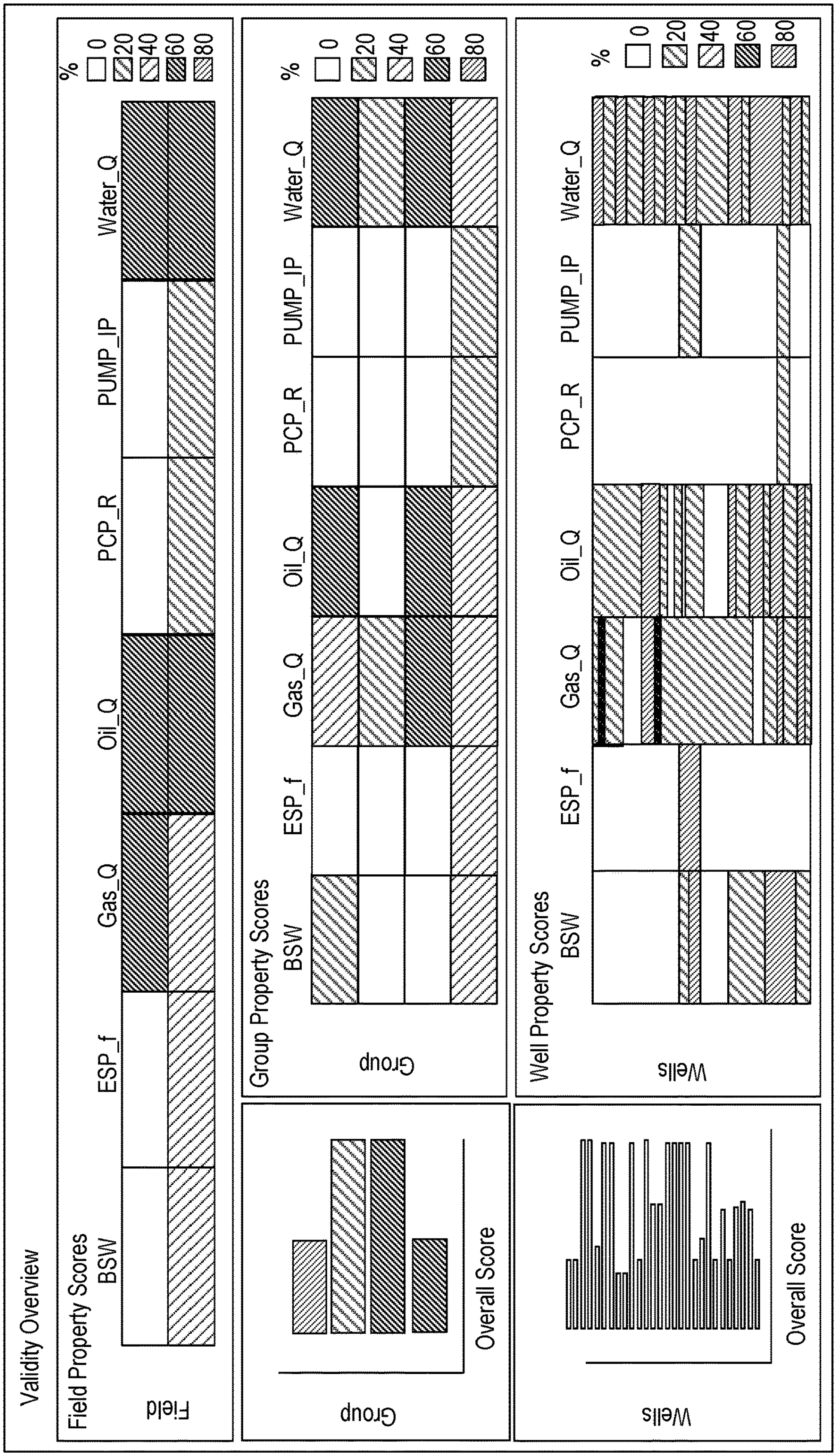
FIG. 17 illustrates an example of a graphical user interface.

FIG. 17 shows an example of a graphical user interface (GUI) 1700 that includes various graphics as to data assessments for field equipment data from multiple data sources. In the example of FIG. 17, the GUI 1700 provides information as to validity assessments. Such a GUI may be compared to the GUI 1600, for example, to compare completeness to validity.

Figure 18:
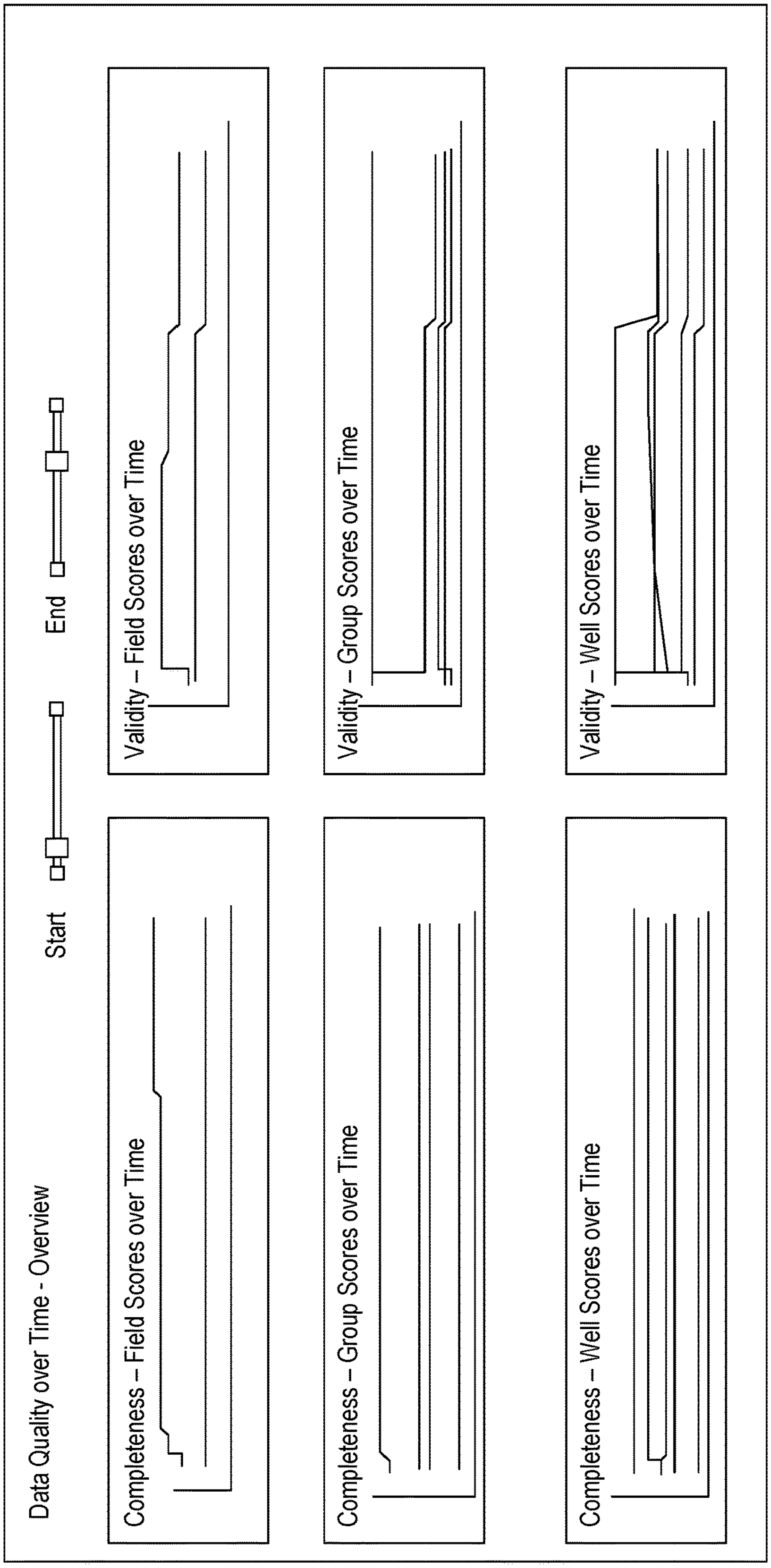
FIG. 18 illustrates an example of a graphical user interface.

FIG. 18 shows an example of a graphical user interface (GUI) 1800 that includes various graphics as to data assessments for field equipment data from multiple data sources. The GUI 1800 provides for graphics for rendering of data and/or assessment metrics with respect to time. For example, consider comparing completeness scores to validity scores over time for a field or fields, for a group or groups and/or for a well or wells. Such an approach may help in identifying one or more issues as to a field, a group and/or a well.

As an example, one or more of the GUIs 800, 900, 1110, 1130, 1300, 1400, 1500, 1600, 1700, 1800, etc., can be based on a hierarchy of data metric values for one or more sources, where the hierarchy can be customizable and navigable, for example, responsive to receipt of instructions. In such an example, a hierarchy may include multiple different types of metrics (e.g., completeness, validity, consistency, etc.) where individual sources may include their own hierarchies, which may break down into equipment, properties, etc. For example, consider a well as including various types of equipment that can provide various types of data that can be assessed as to data metric values.

As an example, a hierarchy may be customizable automatically and/or manually. As to automatic customization, consider an approach that can automatically detect types of data from one or more data sources to construct a hierarchy. In such an example, consider detection of wells in a field where each of the wells includes its own types of data as to different sensors, etc. In such an example, a hierarchy may be automatically generated for wells and sensors where each sensor can be grouped and/or associated with its well.

As an example, a hierarchy can be navigable via one or more approaches. For example, a GUI that can be interacted with via touch, voice, mouse, keyboard, etc., to explore various layers of the hierarchy. In such an example, a hierarchy may be rendered in whole or as a portion, where, in a customizable and navigable approach, an operator may rearrange a hierarchy and then navigate it. As explained with respect to the GUIs 1110 and 1130 of FIG. 11, different views, arrangements, navigations can provide for insights into field production, optionally with an ability to focus in to one or more sources, types of data, etc., which may provide for issuance of one or more signals to control, monitor, service, etc., field equipment. As explained, opportunities may be highlighted for services, which may include installation, replacement, etc., of one or more pieces of field equipment, performing one or more workflows (e.g., framework based, in the field, etc.), etc.

Figure 19:
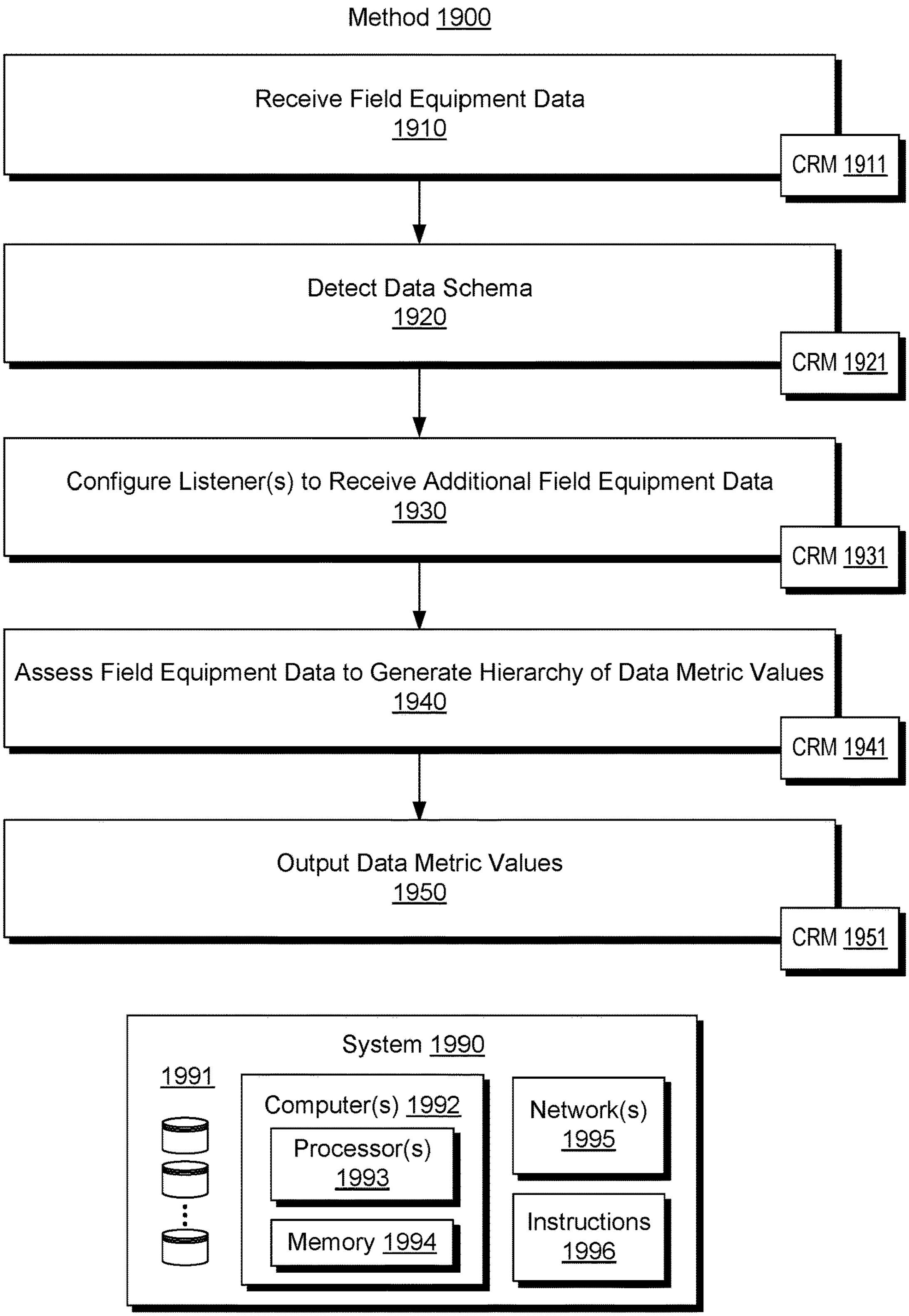
FIG. 19 illustrates an example of a method and an example of a system.

FIG. 19 shows an example of a method 1900 that can include a reception block 1910 for receiving field equipment data from a source; a detection block 1920 for detecting a data schema for the source; a configuration block 1930 for configuring a listener for the source according to a corresponding detected data schema to receive additional field equipment data; and an assessment block 1940 for assessing at least a portion of the additional field equipment data using an assessment engine to generate a hierarchy of data metric values for the source, where the hierarchy is customizable and navigable responsive to receipt of instructions. As shown in the example of FIG. 19, the method 1900 can include an output block 1950 for outputting one or more data metric values.

The method 1900 is shown in FIG. 19 in association with various computer-readable media (CRM) blocks 1911, 1921, 1931, 1941 and 1951. Such blocks generally include instructions suitable for execution by one or more processors (or processor cores) to instruct a computing device or system to perform one or more actions. While various blocks are shown, a single medium may be configured with instructions to allow for, at least in part, performance of various actions of the method 1900. As an example, a computer-readable medium (CRM) may be a computer-readable storage medium that is non-transitory and that is not a carrier wave. As an example, one or more of the blocks 1911, 1921, 1931, 1941 and 1951 may be in the form processor-executable instructions.

In the example of FIG. 19, the system 1990 includes one or more information storage devices 1991, one or more computers 1992, one or more networks 1995 and instructions 1996. As to the one or more computers 1992, each computer may include one or more processors (e.g., or processing cores) 1993 and memory 1994 for storing the instructions 1996, for example, executable by at least one of the one or more processors 1993 (see, e.g., the blocks 1911, 1921, 1931, 1941 and 1951). As an example, a computer may include one or more network interfaces (e.g., wired or wireless), one or more graphics cards, a display interface (e.g., wired or wireless), etc.

As an example, a method can include receiving field equipment data from a source; detecting a data schema for the source; configuring a listener for the source according to a corresponding detected data schema to receive additional field equipment data; and assessing at least a portion of the additional field equipment data using an assessment engine to generate a hierarchy of data metric values for the source, where the hierarchy is customizable and navigable responsive to receipt of instructions. In such an example, the field equipment data can include well production data, for example, consider well production data that include well fluid production equipment sensor data. In such an example, a method may include issuing a signal for control of well production to one or more well fluid production equipment components based at least in part on one or more of the data metric values.

As an example, a source can correspond to a well in a field of wells. In such an example, each of the wells may be a source, optionally an aggregated source of data available from equipment at the well. As an example, a source may be a production network source that is part of a production network that receives fluid from one or more wells.

As an example, a source may be a streaming source, a static source, etc. As an example, a system may operate in real-time where a method can include updating data metric values of a hierarchy or hierarchies in real-time (e.g., consider low latency as being less than about five minutes, etc.).

As an example, a method can include receiving field equipment data from multiple sources; detecting data schema for each of the multiple sources; configuring listeners for the multiple sources according to corresponding detected data schema to receive additional field equipment data from the multiple sources; and assessing at least a portion of the additional field equipment data using an assessment engine to generate a hierarchy of data metric values for the multiple sources, where the hierarchy is customizable and navigable responsive to receipt of instructions.

As an example, an assessment engine can generate one or more directed acyclic graphs (DAGs). In such an example, the assessment engine can be implemented in a distributed computing environment and can include a directed acyclic graph (DAG) scheduler. As explained, a DAG may be formed via one or more data structures and/or components. For example, consider a RDD, a DF and/or a DS, as may be available for a framework such as the APACHE SPARK framework, etc.

As an example, a method can include assessing that generates data metric values for one or more types of data metrics. For example, consider a data completeness metric, a data validity metric, a data completeness metric and a data validity metric, etc.

As an example, a method can include assessing that generates data metric values for at least one data quality metric using machine learning. For example, consider machine learning that generates a trained machine model for outlier detection.

As an example, a method can include assessing that generates data metric values for at least one data quality metric using a user definable assessment rule.

As an example, a method can include rendering a graphical representation of at least a portion of a hierarchy to a display and updating the hierarchy in real-time responsive to receipt of field equipment data to update the graphical representation.

As an example, a method can include rendering a heat map to a display using at least a portion of a hierarchy of data metric values and updating the hierarchy in real-time responsive to receipt of field equipment data to update the heat map.

As an example, a method can include detecting an issue for at least one piece of field equipment using a hierarchy of data metric values. In such an example, a method can include issuing a signal responsive to the detecting of the issue.

As an example, a system can include a processor; memory accessible to the processor; and processor-executable instructions stored in the memory to instruct the system to: receive field equipment data from a source; detect a data schema for the source; configure a listener for the source according to a corresponding detected data schema to receive additional field equipment data; and assess at least a portion of the additional field equipment data using an assessment engine to generate a hierarchy of data metric values for the source, where the hierarchy is customizable and navigable responsive to receipt of instructions.

As an example, one or more computer-readable storage media can include processor-executable instructions to instruct a computing system to: receive field equipment data from a source; detect a data schema for the source; configure a listener for the source according to a corresponding detected data schema to receive additional field equipment data; and assess at least a portion of the additional field equipment data using an assessment engine to generate a hierarchy of data metric values for the source, where the hierarchy is customizable and navigable responsive to receipt of instructions.

As an example, a computer program product can include one or more computer-readable storage media that can include processor-executable instructions to instruct a computing system to perform one or more methods and/or one or more portions of a method.

Figure 20:
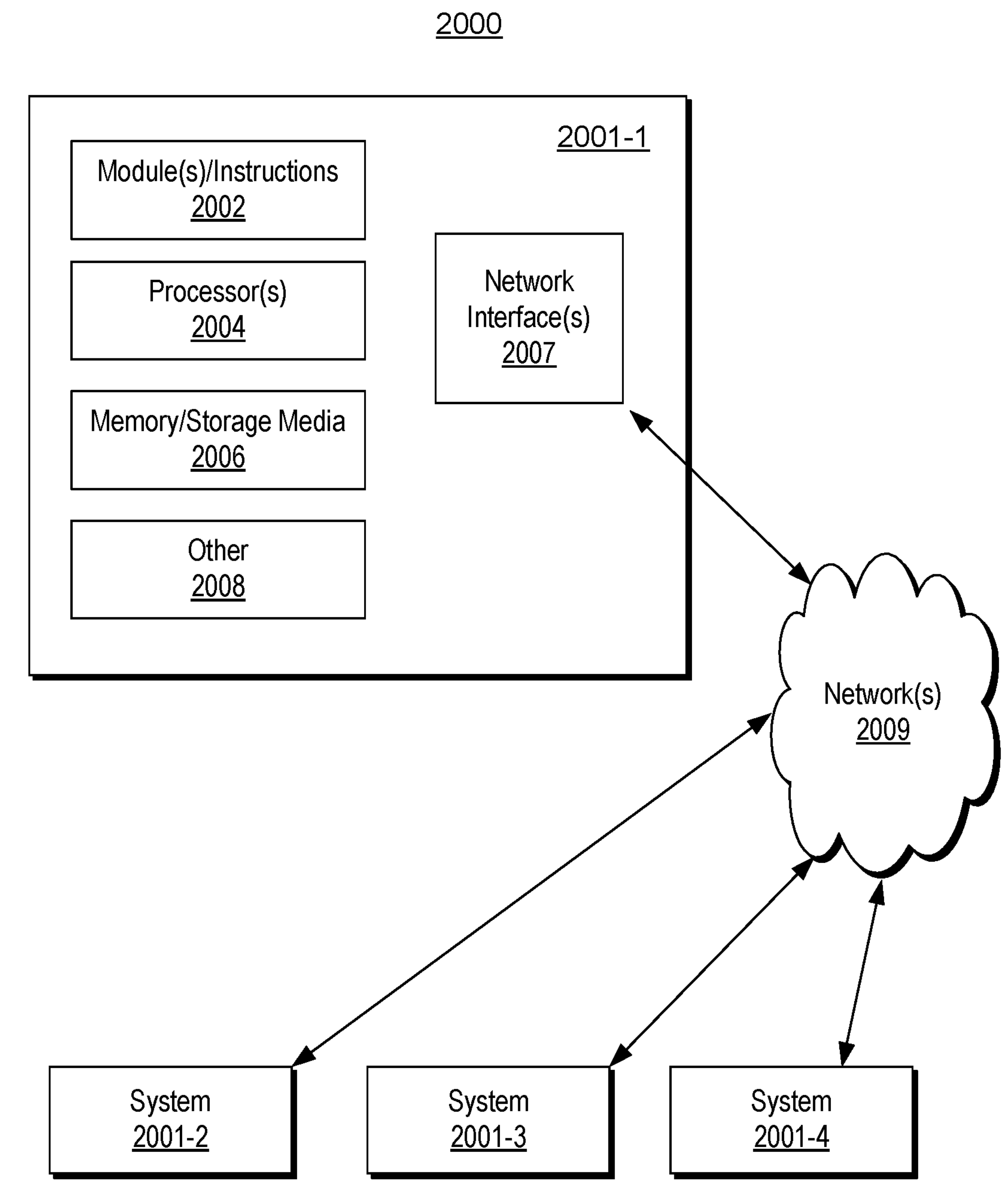
FIG. 20 illustrates examples of computer and network equipment.

In some embodiments, a method or methods may be executed by a computing system. FIG. 20 shows an example of a system 2000 that can include one or more computing systems 2001-1, 2001-2, 2001-3 and 2001-4, which may be operatively coupled via one or more networks 2009, which may include wired and/or wireless networks.

As an example, a system can include an individual computer system or an arrangement of distributed computer systems. In the example of FIG. 20, the computer system 2001-1 can include one or more modules 2002, which may be or include processor-executable instructions, for example, executable to perform various tasks (e.g., receiving information, requesting information, processing information, simulation, outputting information, etc.).

As an example, a module may be executed independently, or in coordination with, one or more processors 2004, which is (or are) operatively coupled to one or more storage media 2006 (e.g., via wire, wirelessly, etc.). As an example, one or more of the one or more processors 2004 can be operatively coupled to at least one of one or more network interface 2007. In such an example, the computer system 2001-1 can transmit and/or receive information, for example, via the one or more networks 2009 (e.g., consider one or more of the Internet, a private network, a cellular network, a satellite network, etc.).

As an example, the computer system 2001-1 may receive from and/or transmit information to one or more other devices, which may be or include, for example, one or more of the computer systems 2001-2, etc. A device may be located in a physical location that differs from that of the computer system 2001-1. As an example, a location may be, for example, a processing facility location, a data center location (e.g., server farm, etc.), a rig location, a wellsite location, a downhole location, etc.

As an example, a processor may be or include a microprocessor, microcontroller, processor module or subsystem, programmable integrated circuit, programmable gate array, or another control or computing device.

As an example, the storage media 2006 may be implemented as one or more computer-readable or machine-readable storage media. As an example, storage may be distributed within and/or across multiple internal and/or external enclosures of a computing system and/or additional computing systems.

As an example, a storage medium or storage media may include one or more different forms of memory including semiconductor memory devices such as dynamic or static random access memories (DRAMs or SRAMs), erasable and programmable read-only memories (EPROMs), electrically erasable and programmable read-only memories (EEPROMs) and flash memories, magnetic disks such as fixed, floppy and removable disks, other magnetic media including tape, optical media such as compact disks (CDs) or digital video disks (DVDs), BLUERAY disks, or other types of optical storage, or other types of storage devices.

As an example, a storage medium or media may be located in a machine running machine-readable instructions, or located at a remote site from which machine-readable instructions may be downloaded over a network for execution.

As an example, various components of a system such as, for example, a computer system, may be implemented in hardware, software, or a combination of both hardware and software (e.g., including firmware), including one or more signal processing and/or application specific integrated circuits.

As an example, a system may include a processing apparatus that may be or include a general purpose processors or application specific chips (e.g., or chipsets), such as ASICs, FPGAs, PLDs, or other appropriate devices.

Figure 21:
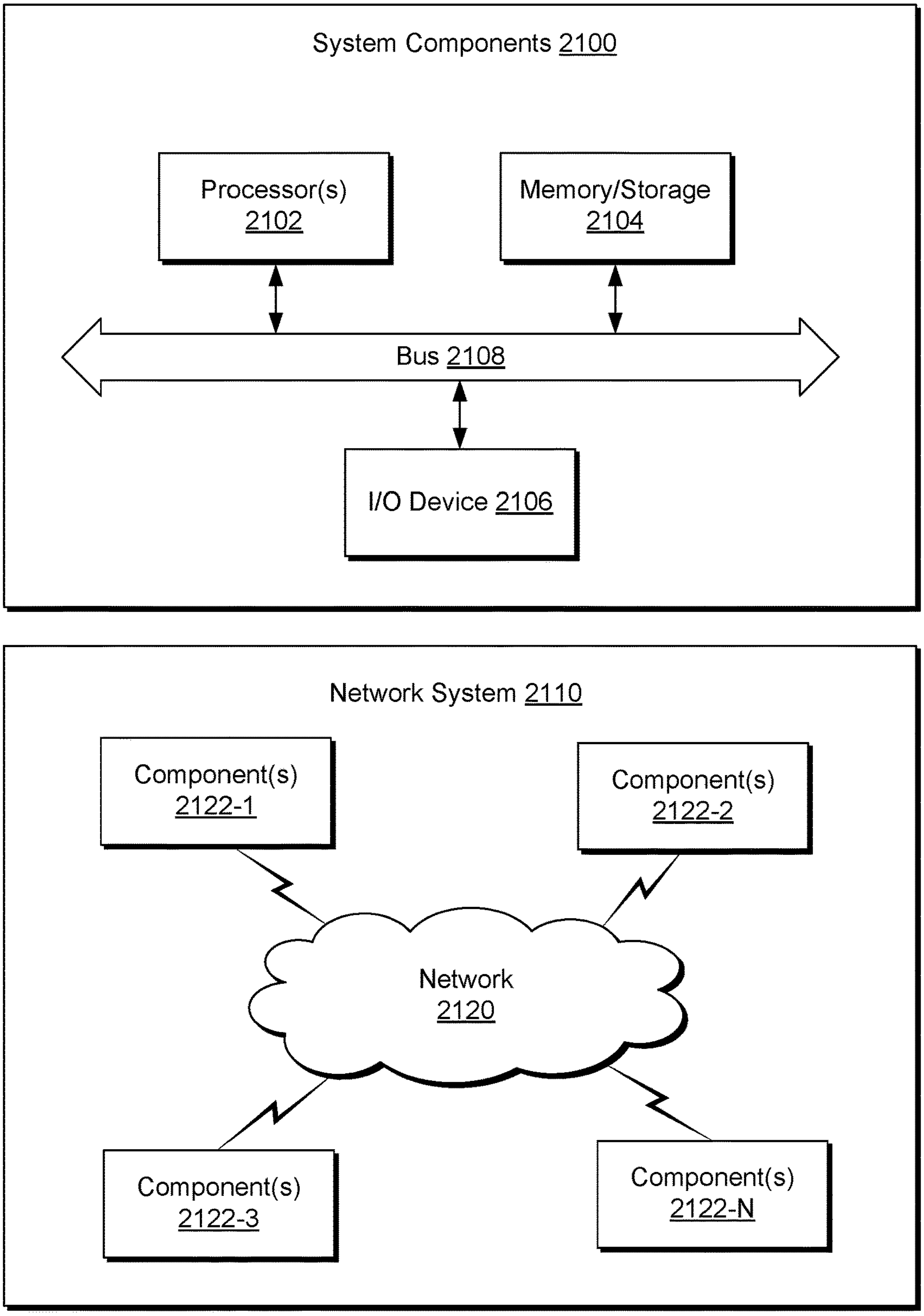
FIG. 21 illustrates example components of a system and a networked system.

FIG. 21 shows components of an example of a computing system 2100 and an example of a networked system 2110 with a network 2120. The system 2100 includes one or more processors 2102, memory and/or storage components 2104, one or more input and/or output devices 2106 and a bus 2108. In an example embodiment, instructions may be stored in one or more computer-readable media (e.g., memory/storage components 2104). Such instructions may be read by one or more processors (e.g., the processor(s) 2102) via a communication bus (e.g., the bus 2108), which may be wired or wireless. The one or more processors may execute such instructions to implement (wholly or in part) one or more attributes (e.g., as part of a method). A user may view output from and interact with a process via an I/O device (e.g., the device 2106). In an example embodiment, a computer-readable medium may be a storage component such as a physical memory storage device, for example, a chip, a chip on a package, a memory card, etc. (e.g., a computer-readable storage medium).

In an example embodiment, components may be distributed, such as in the network system 2110. The network system 2110 includes components 2122-1, 2122-2, 2122-3, . . . 2122-N. For example, the components 2122-1 may include the processor(s) 2102 while the component(s) 2122-3 may include memory accessible by the processor(s) 2102. Further, the component(s) 2122-2 may include an I/O device for display and optionally interaction with a method. The network 2120 may be or include the Internet, an intranet, a cellular network, a satellite network, etc.

As an example, a device may be a mobile device that includes one or more network interfaces for communication of information. For example, a mobile device may include a wireless network interface (e.g., operable via IEEE 802.11, ETSI GSM, BLUETOOTH, satellite, etc.). As an example, a mobile device may include components such as a main processor, memory, a display, display graphics circuitry (e.g., optionally including touch and gesture circuitry), a SIM slot, audio/video circuitry, motion processing circuitry (e.g., accelerometer, gyroscope), wireless LAN circuitry, smart card circuitry, transmitter circuitry, GPS circuitry, and a battery. As an example, a mobile device may be configured as a cell phone, a tablet, etc. As an example, a method may be implemented (e.g., wholly or in part) using a mobile device. As an example, a system may include one or more mobile devices.

As an example, a system may be a distributed environment, for example, a so-called "cloud" environment where various devices, components, etc. interact for purposes of data storage, communications, computing, etc. As an example, a device or a system may include one or more components for communication of information via one or more of the Internet (e.g., where communication occurs via one or more Internet protocols), a cellular network, a satellite network, etc. As an example, a method may be implemented in a distributed environment (e.g., wholly or in part as a cloud-based service).

As an example, information may be input from a display (e.g., consider a touchscreen), output to a display or both. As an example, information may be output to a projector, a laser device, a printer, etc. such that the information may be viewed. As an example, information may be output stereographically or holographically. As to a printer, consider a 2D or a 3D printer. As an example, a 3D printer may include one or more substances that can be output to construct a 3D object. For example, data may be provided to a 3D printer to construct a 3D representation of a subterranean formation. As an example, layers may be constructed in 3D (e.g., horizons, etc.), geobodies constructed in 3D, etc. As an example, holes, fractures, etc., may be constructed in 3D (e.g., as positive structures, as negative structures, etc.).

Although only a few example embodiments have been described in detail above, those skilled in the art will readily appreciate that many modifications are possible in the example embodiments. Accordingly, all such modifications are intended to be included within the scope of this disclosure as defined in the following claims. In the claims, means-plus-function clauses are intended to cover the structures described herein as performing the recited function and not only structural equivalents, but also equivalent structures. Thus, although a nail and a screw may not be structural equivalents in that a nail employs a cylindrical surface to secure wooden parts together, whereas a screw employs a helical surface, in the environment of fastening wooden parts, a nail and a screw may be equivalent structures.

What is claimed is:

1. A method comprising:

receiving field equipment data from a source, wherein the source includes a sensor;

detecting a data schema for the source, wherein the data schema includes a data format and data quality metrics;

configuring a listener for the source according to the data schema;

receiving additional field equipment data;

detecting a change in the data schema from the additional field equipment data;

assessing at least a portion of the additional field equipment data using an assessment engine to generate a hierarchy of data metric values for the source, wherein the hierarchy of data metric values is customizable and navigable responsive to receipt of instructions;

responsive to the change in the data schema and the hierarchy of data metric values indicating poor quality data for the portion of the additional field equipment data, taking the sensor off-line; and responsive to taking the sensor off-line, implementing a digital twin to generate substitute data for the sensor.

2. The method of claim 1, wherein the field equipment data comprises well production data.

3. The method of claim 2, wherein the well production data comprises well fluid production equipment sensor data.

4. The method of claim 3, further comprising issuing a signal for control of well production to one or more well fluid production equipment components based at least in part on one or more of the data metric values.

5. The method of claim 1, wherein the source corresponds to a well in a field of wells.

6. The method of claim 1, wherein the source comprises a streaming source.

7. The method of claim 1, wherein the source comprises a static source.

8. The method of claim 1, wherein the source includes a plurality of sources, and wherein:

receiving the field equipment data includes receiving the field equipment data from the plurality of sources;

detecting the data schema includes detecting the data schema for each of the plurality of sources;

configuring the listener includes configuring a plurality of listeners for the plurality of sources according to the data schema from the plurality of sources; and assessing the portion of the additional field equipment data generating the hierarchy of data metric values for the plurality of sources.

9. The method of claim 1, wherein the assessment engine generates one or more directed acyclic graphs (DAGs).

10. The method of claim 9, wherein the assessment engine is implemented in a distributed computing environment and comprises a directed acyclic graph (DAG) scheduler.

11. The method of claim 1, wherein the hierarchy of data metric values includes at least one of a data completeness metric or a data validity metric.

12. The method of claim 1, wherein assessing the additional field equipment data includes generating the hierarchy of data metric values using machine learning.

13. The method of claim 12, further comprising training a machine learning model on outlier detection using the hierarchy of data metric values, resulting in a trained machine model.

14. The method of claim 1, further comprising rendering a graphical representation of at least a portion of the hierarchy of data metric values to a display and updating the hierarchy of data metric values in real-time responsive to receipt of yet additional field equipment data to update the graphical representation.

15. The method of claim 1, further comprising rendering a heat map to a display using at least a portion of the hierarchy of data metric values and updating the hierarchy of data metric values in real-time responsive to receipt of yet additional field equipment data to update the heat map.

16. The method of claim 1, further comprising detecting an issue for at least one piece of field equipment using the hierarchy of data metric values.

17. The method of claim 1, wherein the poor quality data includes a system breach.

18. The method of claim 1, wherein the hierarchy of data metric values indicating the poor quality data includes the hierarchy of data metric values indicating the poor quality data by generating a Z distribution and computing a Z score from the Z distribution.

19. A system comprising:

a processor;

memory accessible to the processor; and processor-executable instructions stored in the memory to instruct the system to:

receive field equipment data from a source, wherein the source includes a sensor;

detect a data schema for the source, wherein the data schema includes a data format and data quality metrics;

configure a listener for the source according to the data schema;

receive additional field equipment data;

detect a change in the data schema from the additional field equipment data;

assess at least a portion of the additional field equipment data using an assessment engine to generate a hierarchy of data metric values for the source, wherein the hierarchy of data metric values is customizable and navigable responsive to receipt of instructions;

responsive to the change in the data schema and the hierarchy of data metric values indicating poor quality data for the portion of the additional field equipment data, take the sensor off-line; and responsive to taking the sensor off-line, implement a digital twin to generate substitute data for the sensor.

20. One or more non-transitory computer-readable storage media comprising processor-executable instructions to instruct a computing system to:

receive field equipment data from a source, wherein the source includes a sensor;

detect a data schema for the source, wherein the data schema includes a data format and data quality metrics;

configure a listener for the source according to the data schema;

receive additional field equipment data;

detect a change in the data schema from the additional field equipment data;

assess at least a portion of the additional field equipment data using an assessment engine to generate a hierarchy of data metric values for the source, wherein the hierarchy of data metric values is customizable and navigable responsive to receipt of instructions;

responsive to the change in the data schema and the hierarchy of data metric values indicating poor quality data for the portion of the additional field equipment data by generating a Z distribution and computing a Z score from the Z distribution, take the sensor off-line; and responsive to taking the sensor off-line, implement a digital twin to generate substitute data for the sensor.

* * * * *